United States Patent [19]
Bright et al.

[11] Patent Number: 4,893,339
[45] Date of Patent: Jan. 9, 1990

[54] SECURE COMMUNICATION SYSTEM

[75] Inventors: Michael W. Bright, Arlington Heights; Eric F. Ziolko, Schaumburg; Alan L. Wilson, Hoffman Estates; Michelle M. Bray, Schaumburg; Harry A. Hennen, Woodstock; David L. Weiss, Roselle, all of Ill.

[73] Assignee: Motorola, Inc., Schaumburg, Ill.

[21] Appl. No.: 903,360

[22] Filed: Sep. 30, 1986

[51] Int. Cl.⁴ .............................................. H04K 1/00
[52] U.S. Cl. ...................................... 380/28; 380/21; 380/43; 380/46; 380/48
[58] Field of Search .............. 178/22.10, 22.13, 22.17; 129/1.5 S; 380/28, 21, 46, 48, 29, 30, 43; 364/200, 900

[56] References Cited

U.S. PATENT DOCUMENTS

| | | | |
|---|---|---|---|
| 2,777,897 | 1/1957 | Gretener et al. | 380/8 |
| 3,586,776 | 6/1971 | Salava | 178/69.5 R |
| 3,610,828 | 10/1971 | Billerica et al. | 380/48 |
| 3,852,534 | 12/1974 | Tilk | 370/107 |
| 3,906,445 | 9/1975 | Beckmann et al. | 340/146.1 BA |
| 4,020,285 | 4/1977 | Branscome et al. | 380/21 |
| 4,052,565 | 10/1977 | Baxter et al. | 380/28 |
| 4,086,435 | 4/1978 | Graupe et al. | 380/49 |
| 4,126,761 | 11/1978 | Graupe et al. | 380/20 |
| 4,149,035 | 4/1979 | Frutiger | 380/36 |
| 4,158,748 | 6/1979 | En | 178/69.1 |
| 4,167,700 | 10/1979 | Coe et al. | 325/32 |
| 4,171,513 | 10/1979 | Otey et al. | 380/43 |
| 4,182,933 | 1/1980 | Rosenblum | 380/21 |
| 4,243,941 | 1/1981 | Zdunek | 329/50 |
| 4,266,243 | 5/1981 | Shutterly | 179/1.5 S |
| 4,268,720 | 5/1981 | Olberg et al. | 380/36 |
| 4,271,520 | 6/1981 | Coombes et al. | 371/42 |
| 4,302,628 | 11/1981 | Akrich et al. | 380/43 |
| 4,354,265 | 10/1982 | Nyberg et al. | 370/111 |
| 4,394,760 | 7/1983 | Kammerlander | 370/111 |
| 4,411,017 | 10/1983 | Talbot | 455/26 |
| 4,434,323 | 2/1984 | Levine et al. | 179/1.5 S |
| 4,484,027 | 11/1984 | Lee et al. | 380/21 |
| 4,516,241 | 5/1985 | Farah et al. | 370/110.1 |
| 4,567,591 | 1/1986 | Gray et al. | 370/109 |
| 4,608,456 | 8/1986 | Paik et al. | 179/1.5 S |
| 4,611,342 | 9/1986 | Miller et al. | |
| 4,612,414 | 9/1986 | Juang | 380/41 |
| 4,631,746 | 12/1986 | Bergeron et al. | 381/35 |
| 4,633,036 | 12/1986 | Hellman et al. | 380/30 |
| 4,634,808 | 1/1987 | Moerder | 380/46 |
| 4,642,424 | 2/1987 | McNair | 380/48 |
| 4,654,480 | 3/1987 | Weiss | 380/48 |
| 4,667,327 | 5/1987 | Bright et al. | 371/47 |
| 4,680,791 | 7/1987 | Kato et al. | 380/8 |
| 4,680,797 | 7/1987 | Benke | 381/41 |
| 4,688,257 | 8/1987 | Erickson | 380/48 |
| 4,697,264 | 9/1987 | Galensky et al. | 370/111 |
| 4,697,277 | 2/1987 | Van Rassel | 375/116 |
| 4,719,643 | 1/1988 | Beeman | 375/115 |
| 4,723,246 | 2/1988 | Weldon, Jr. | 371/42 |
| 4,742,546 | 5/1988 | Nishimura et al. | 380/28 X |
| 4,744,080 | 5/1988 | Brennand et al. | 380/21 |
| 4,752,953 | 6/1988 | Paik et al. | 380/9 |

FOREIGN PATENT DOCUMENTS

0178608A2  4/1986  European Pat. Off.

OTHER PUBLICATIONS

E. D. Rainville, *Elementary Diff. Eq.s;* (MacMillan, 1981; pp. 95–96).
J. L. Fike et al., *Understanding Telephone Electronics;* (Sams & Co., Indianapolis; 1983; pp. 6–24, 6–25, 6–28 to 6–31).
Friend et al., *Understanding Data Comm.;* (Sams & Co., Indianapolis; 1984; pp. 2–20 to 2–28).
"Privacy and Authentication: An Introduction to Cryptography" by Whitfield Diffie, and Martin E. Hellman, Proceedings of the IEEE, vol. 67, No. 3, Mar. 1979.

*Primary Examiner*—Stephen C. Buczinski
*Assistant Examiner*—Bernarr Earl Gregory
*Attorney, Agent, or Firm*—Thomas G. Berry; Steven G. Parmelee

[57] ABSTRACT

Disclosed is a synchronous secure communication system wherein an information signal is encrypted in an encryption means. The encrypted signal is compressed to allow the insertion of a synchronization signal, and the combined signals are transmitted. At the receiver, the synchronization signal is extracted and used to synchronize the receiver to the incoming data stream thereby improving receiver sensitivity and range.

53 Claims, 12 Drawing Sheets

208

238

| Clock Cycles | \- | RAM ADDRESSES | | | | | | | | | OUTPUT |
|---|---|---|---|---|---|---|---|---|---|---|---|
| | | 0 | 1 | 2 | 3 | 4 | 5 | 6 | 7 | 8 | |
| 0 | | WR | | | | | | | | | SIGNAL |
| 1 | | | WR | | | | | | | | SIGNAL |
| 2 | | | | WR | | | | | | | SIGNAL |
| 3 | | | | | WR | | | | | | SIGNAL |
| 4 | | | | | | WR | | | | | SIGNAL |
| 5 | | | | | | | WR | | | | SIGNAL |
| 6 | | | | | | | W | R | | | SIGNAL |
| 7 | | | | | | | | W | R | | SIGNAL |
| 8 | | | | | | | | | W | R | SIGNAL |
| 9 | | R | | | | | | | | W | 0 |
| 10 | | W | R | | | | | | | | 1 |
| 11 | | | W | R | | | | | | | 2 |
| 12 | | | W | | R | | | | | | 3 |
| 13 | | | | W | | R | | | | | 4 |
| 14 | | | | | W | | R | | | | 6 |
| 15 | | | | | | W | | R | | | 7 |
| 16 | | | | | | | W | | R | | 8 |
| 17 | | | | | | | | W | | R | 9 |
| 18 | | R | | | | | | W | | | 10 |
| 19 | | | R | | | | | | W | | 12 |
| 20 | | | | R | | | | | | W | 13 |
| 21 | | W | | | R | | | | | | 14 |
| 22 | | | W | | | R | | | | | 15 |
| 23 | | | | W | | | R | | | | 16 |
| 24 | | | | W | | | | R | | | 18 |
| 25 | | | | | W | | | | R | | 19 |
| 26 | | | | | | W | | | | R | 20 |
| 27 | | R | | | | | W | | | | 21 |
| 28 | | | R | | | | | W | | | 22 |
| 29 | | | | R | | | | | W | | 24 |
| 30 | | | | | R | | | | W | | 25 |
| 31 | | | | | | R | | | | W | 26 |
| 32 | | W | | | | | R | | | | 27 |
| 33 | | | W | | | | | R | | | 28 |
| 34 | | | | W | | | | | R | | 30 |
| 35 | | | | | W | | | | | R | 31 |
| 36 | | R | | | W | | | | | | 32 |
| 37 | | | R | | | W | | | | | 33 |
| 38 | | | | R | | | W | | | | 34 |
| 39 | | | | | R | | | W | | | 36 |
| 40 | | | | | | R | | W | | | 37 |
| 41 | | | | | | | R | | W | | 38 |
| 42 | | | | | | | | R | | W | 39 |
| 43 | | W | | | | | | | R | | 40 |
| 44 | | | W | | | | | | | R | 42 |
| 45 | | R | | W | | | | | | | 43 |
| 46 | | | R | | W | | | | | | 44 |
| 47 | | | | R | | W | | | | | 45 |
| 48 | | | | | R | W | | | | | 46 |
| 49 | | | | | R | | W | | | | 48 |
| 50 | | | | | | | R | W | | | 49 |
| 51 | | | | | | | | R | W | | 50 |
| 52 | | | | | | | | | R | W | 51 |
| 53 | | W | | | | | | | | R | 52 |
| 54 | | WR | | | | | | | | | SIGNAL |
| 55 | | | WR | | | | | | | | SIGNAL |

| | RAM ADDRESSES | | | | | | | | | OUTPUT |
|---|---|---|---|---|---|---|---|---|---|---|
| | 0 | 1 | 2 | 3 | 4 | 5 | 6 | 7 | 8 | |
| 0 | WR | | | | | | | | | 0 |
| 1 | | WR | | | | | | | | 1 |
| 2 | | | WR | | | | | | | 2 |
| 3 | | | | WR | | | | | | 3 |
| 4 | | | | | WR | | | | | 4 |
| 5 | | | | | | WR | | | | PREDICT |
| 6 | | | | | | R | W | | | 5 |
| 7 | | | | | | | R | W | | 6 |
| 8 | | | | | | | | R | W | 7 |
| 9 | W | | | | | | | | R | 8 |
| 10 | R | W | | | | | | | | 9 |
| 11 | | R | W | | | | | | | PREDICT |
| 12 | | R | | W | | | | | | 10 |
| 13 | | | R | | W | | | | | 11 |
| 14 | | | | R | | W | | | | 12 |
| 15 | | | | | R | | W | | | 13 |
| 16 | | | | | | R | | W | | 14 |
| 17 | | | | | | R | R | | W | PREDICT |
| 18 | W | | | | | | R | | | 15 |
| 19 | W | | | | | | | R | | 16 |
| 20 | | | W | | | | | | R | 17 |
| 21 | R | | | W | | | | | | 18 |
| 22 | | R | | | W | | | | | 19 |
| 23 | | | R | | | W | | | | PREDICT |
| 24 | | | R | | | | W | | | 20 |
| 25 | | | | R | | | | W | | 21 |
| 26 | | | | | R | | | | W | 22 |
| 27 | W | | | | | R | | | | 23 |
| 28 | | W | | | | | R | | | 24 |
| 29 | | | W | | | | | R | | PREDICT |
| 30 | | | W | | | | | R | | 25 |
| 31 | | | | | W | | | | R | 26 |
| 32 | R | | | | | W | | | | 27 |
| 33 | | R | | | | | W | | | 28 |
| 34 | | | R | | | | | W | | 29 |
| 35 | | | | R | | | | | W | PREDICT |
| 36 | W | | | R | | | | | | 30 |
| 37 | | W | | | R | | | | | 31 |
| 38 | | | W | | | R | | | | 32 |
| 39 | | | | W | | | R | | | 33 |
| 40 | | | | | W | | | R | | 34 |
| 41 | | | | | | W | | | R | PREDICT |
| 42 | | | | | | | W | | R | 35 |
| 43 | R | | | | | | | W | | 36 |
| 44 | | R | | | | | | | W | 37 |
| 45 | W | | R | | | | | | | 38 |
| 46 | | W | | R | | | | | | 39 |
| 47 | | | W | | R | | | | | PREDICT |
| 48 | | | | W | R | | | | | 40 |
| 49 | | | | | W | R | | | | 41 |
| 50 | | | | | | R W | | | | 42 |
| 51 | | | | | | | R W | | | 43 |
| 52 | | | | | | | | R W | | 44 |
| 53 | R | | | | | | | | R W | PREDICT |
| 54 | WR | | | | | | | | | 45 |
| 55 | | WR | | | | | | | | 46 |

SECURE COMMUNICATION SYSTEM

TECHNICAL FIELD

This invention relates generally to two-way communication systems and more particularly to secure two-way communication systems and is particularly directed toward providing a two-way secure voice communication system.

BACKGROUND ART

Secure communications systems are known. The goal of such systems is to render a message unintelligible so as to prevent unauthorized reception. Typically, a message, such as a voice message, is digitized and processed through an encryption device to produce a signal that is random or pseudo-random in nature, thus appearing noise-like to the unauthorized receiver. The particular encryption algorithm used by the encryption device may be a proprietary algorithm, or may be based on a standard such as the Data Encryption Standard (DES) promulgated by the National Bureau of Standards (NBS), of the United States Government.

Generally, it is known to operate a selected encryption device in the cipher feedback (CFB) mode, wherein the cipher text output signal is added (modulo two) with the plain text input signal; the result being feedback into the encryption device. As used herein, cipher text means the encrypted unintelligible signal transmitted from, or received by, an encryption device operating within a secure communication system. Further, as used herein, plain text means the unencrypted (or "clear") signal transmitted from, or received by, an encryption device operating within a secure communication system. Those skilled in the art will appreciate that the wide utilization of the CFB mode of operation was due chiefly to the self-synchronizing signal (as related to encryption synchronization) that is produced. In fact, the NBS has suggested that secure communication equipment suppliers employing the D.E.S. design their systems to operate in the CFB mode.

However, a secure communication system having transceiving devices that operate in the CFB mode suffers a serious detriment in that the transceiving devices have a reduced operational range. The range reduction is caused by error multiplication in the receiver, which manifests itself as degraded receiver sensitivity. The error multiplication is fundamental to the CFB concept since an erroneously received bit is applied to the encryption algorithm input until the error finally "clears" or is shifted out of the algorithm input register. Thus, for D.E.S. with an input register of 64 bits, a single erroneously received bit produces sixty-four errors in the plain text output stream. Receiver sensitivity reduction of 4–6 dB is typical, and, depending on the transmitter power, may result in a range reduction measured in miles. Therefore, a need exists for a secure communication system to overcome the range reduction problem of the prior art.

SUMMARY OF THE INVENTION

Accordingly, it is an object of the present invention to provide an improved secure communication system.

It is a further object of the present invention to provide a synchronous secure communication system having extended range.

It is another object of the present invention to provide a synchronous transceiving device capable of operating in the secure communication system of the present invention.

It is yet a further object of the present invention to provide a synchronous receive-only device capable of operating in the secure communication system of the present invention.

It is still another object of the present invention to provide a means for especially adapting prior CFB devices thereby enabling them operating within the extended range secure communication system of the present invention.

It is yet another object of the present invention to provide a method for compressing a digital signal to insert a synchronization signal.

It is still a further object of the present invention to provide an improved synchronization detector for use in a secure communication system.

It is yet a further object of the present invention to provide a method for expanding a compressed digital signal with bit prediction.

It is the final object of the present invention to provide a synchronous secure communication system having extended range.

It is the ultimate object of the present invention to provide an improved secure communication system.

Briefly, according to the invention, a synchronous secure communication system is provided wherein an information signal is encrypted in an encryption means. The encrypted signal is compressed to allow the insertion of a synchronization signal, and the combined signals are transmitted. At the receiver, the synchronization signal is extracted and used to synchronize the receiver to the incoming data stream thereby improving receiver sensitivity and range.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like reference numerals identify like elements, and in which:

FIG. 7 is a chart illustrating the operation of the compressor of FIG. 6;

FIG. 11 is a chart illustrating the operation of the expander of FIG. 10;

DETAILED DESCRIPTION OF THE PREFERRED EMBODIMENT

Figure 1A:
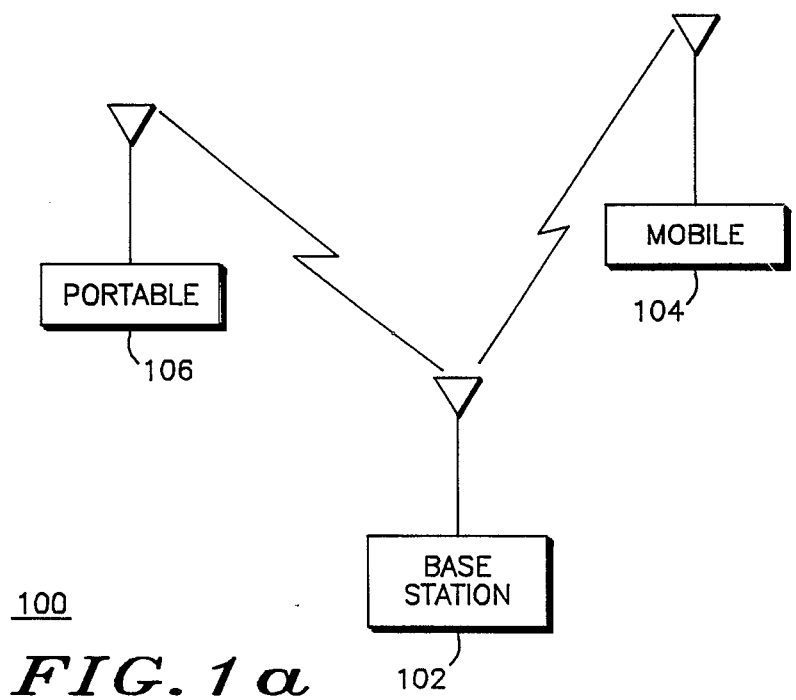
FIGS. 1a–b are a block diagrams of the secure communication system of the present invention.
Figure 1B:
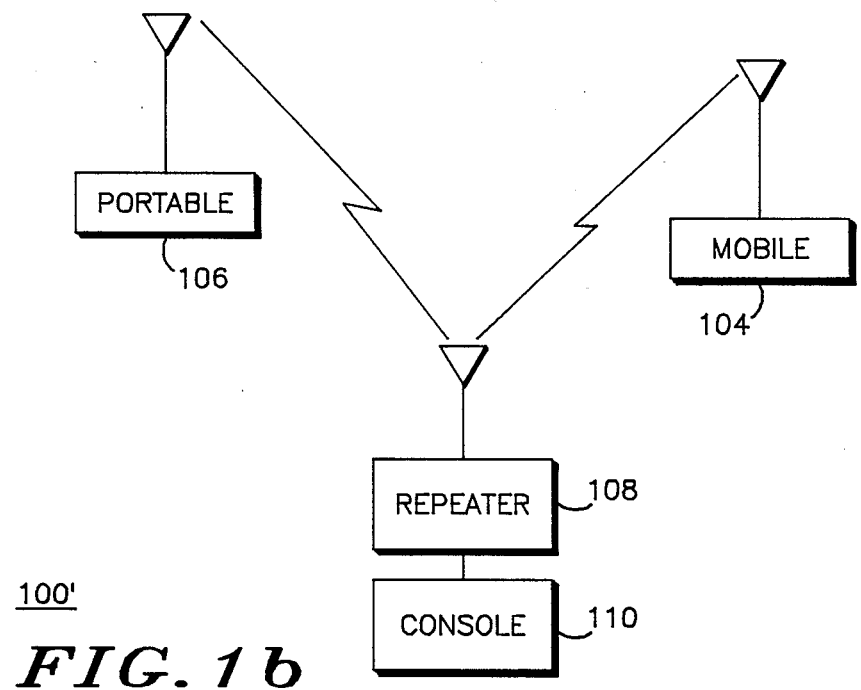

Referring now to the drawings and in particular to FIG. 1a, there is shown a block diagram of the secure communication system 100 of the present invention. Basically, the secure communication system 100 is comprised of at least one base station 102, and a plurality of remote units 104 and 106. In FIG. 1b, a console 110 communicates with the remote units via a repeater 108. Preferably, the repeater 108 operates to repeat an encrypted message without decrypting it locally. In this way, end-to-end security of the message is maintained. Moreover, "transparent" repeaters that do not locally decrypt the message do not require the "encryption key", and thus, provide a system advantage in that a system operator need not commute to each repeater site to periodically change the encryption key to maintain system security. The remote units communicating on this system may include mobile units 104, or portable units 106. Typically, mobile units are understood to be transceivers designed to operate in a vehicle. A portable unit is typically understood to be a transceiving or receive-only device designed primarily to be carried on or about the person. Base stations, and repeaters are usually permanent or semi-permanent installations in buildings or other such fixed locations. As used herein, any of these devices that are capable of encrypting and decrypting an information signal to communicate within the secure communication system 100 are collectively referred to as transceiving devices.

Figure 2:
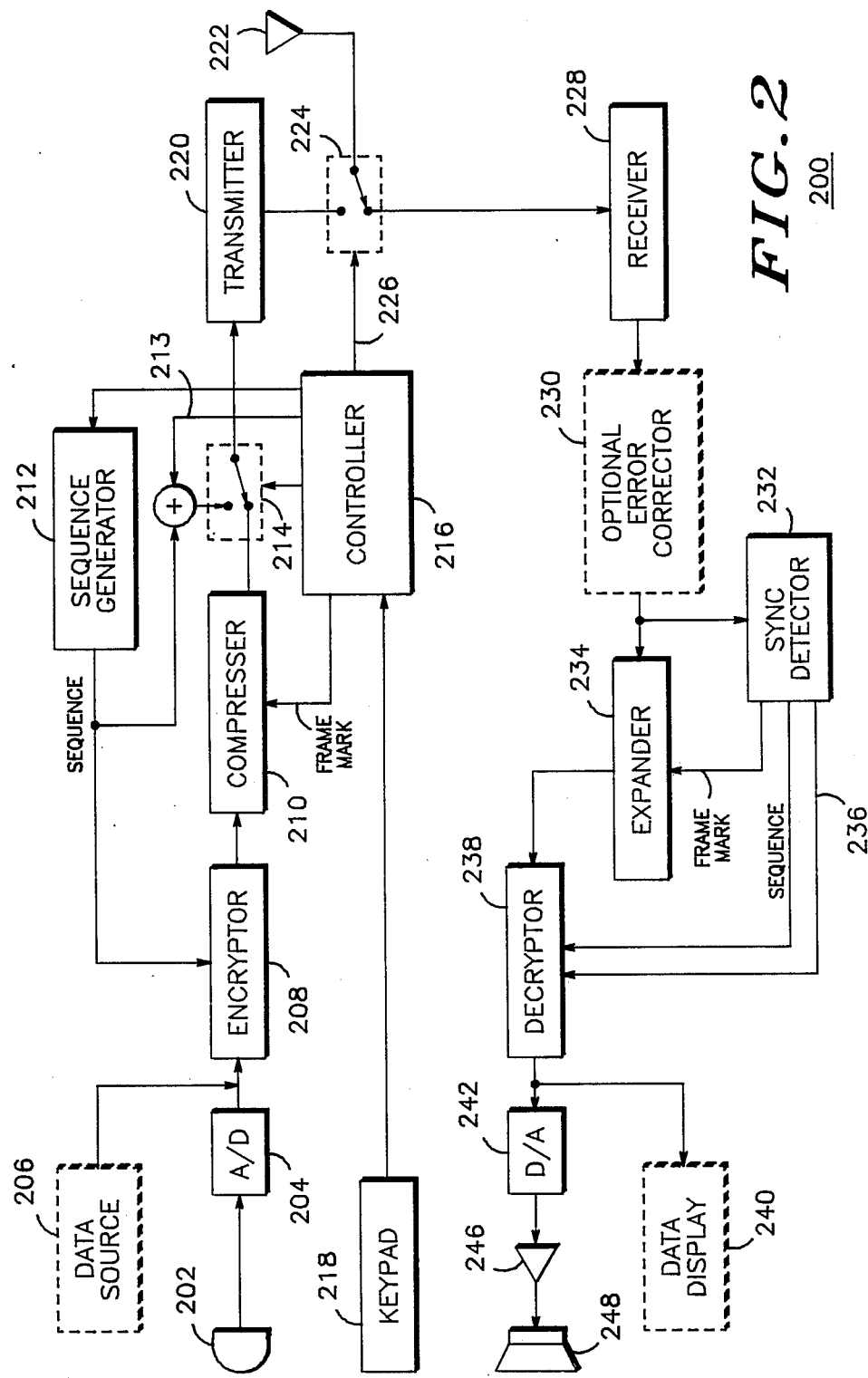
FIG. 2 is a block diagram of a transceiving device capable of operating in the system of FIG. 1.

Referring now to FIG. 2, a transceiving device 200 capable of operating in the secure communication system 100 of FIG. 1 is shown. To transmit a message, an information signal, such as a voice signal, is provided by the microphone 202 to the analog-to-digital (A/D) converter 204. The A/D 204 may be any suitable device which provides a digital representation of the voice signal, and preferably is a Continuously Variable Slope Delta-Modulator (CVSD). Those skilled in the art can appreciate that human speech contains a large amount of redundant information. Speech production may be modeled as an excitation signal (i.e., air from the lungs) driving a filter (the vocal tract), which possesses a certain resonant structure. The spoken sound changes with time since the filter varies with time. The excitation is noise-like for unvoiced sounds (i.e., consonants) and appears as a periodic excitation for voiced sounds (for example vowels). The continuous noise-like consonants, combined with the periodic excitation of vowels, produces a voice signal having a highly redundant information content.

Referring still to FIG. 2, the speech signal is digitized in the A/D 204, which preserves the redundancy in the speech signal. It is especially convenient if the technique used to digitize an inherently redundant voice signal produces redundant digital patterns. Such techniques are known in the art and preferably a CVSD device is used since they are known to produce a digital waveform having several consecutive "ones" and "zeros". Alternately, a data source 206 may provide the information signal, which may be any data signal (such as computer data) provided that the data signal contains, or may be adapted to contain, redundant information. One method known in the art for adapting a data signal to contain redundant information is interpolation sampling wherein a data bit is held in a sample and hold device and its logical state clocked out for a predetermined number of times. In this way, each data bit may be replicated within the data stream thereby providing redundancy. At the receiver, the redundant bits are simply discarded prior to presenting the information signal to the operator.

The digital information (plain text) signal is applied to an encryptor 208, which encrypts the information signal producing a random or pseudo-random encrypted signal that preferably resembles a noise signal. Preferably, the encryptor 208 is coupled to the sequence generator 212 such that it operates in the Counter Addressing (CA), or linear recursion, mode as will be hereinafter fully described. Those skilled in the art will appreciate that any digital encryption device may be used as the encryptor 208, including CFB devices so long as they are especially adapted for use with the present invention as will also hereinafter be fully described. The encrypted (cipher text) signal is provided to the compressor 210, which discards selected bits or small groups of bits of the encrypted signal and compresses the remaining bits to make room for a synchronization signal supplied by a sequence generator 212. Preferably, the sequence generator 212 is capable of providing a plurality of synchronization signals, each of which is random or pseudo-random in nature since they are interleaved with the encrypted signal. The plurality of synchronization signals may be used as group identification (ID codes) to divide, for example, Police and Fire departments, or other such tactical groups operating on the same system. Moreover, a "dummy" synchronization signal may be used by the secure communication system of the present invention to continuously transmit information, such as an electronically stored copy of a textbook or encyclopedia, so that there is continuous "traffic" on the system. In this way, the unauthorized receiver will not be able to detect the information traffic increase that typically occurs during the handling of an emergency. Of course, to continuously transmit information and still receive a message, the antenna switch 224 must be replaced by a duplexer as known in the art. One of the plurality of synchronization sequences may be selected by the controller 216 to be combined with any particular message. At the conclusion of the information message, the dummy sequence may be reselected to maintain continuous transmission. Alternately, a predetermined digital word may be used as the synchronization signal, however, the security of the communication system may be comprised since the unauthorized receiver may easily determine which portion of the signal is encrypted information and which is merely synchronization information.

The synchronization signal is interleaved with the compressed encrypted signal via the switch 214. The switch 214 is controlled by a controller 216, which may be a microprocessor or suitable equivalent. The controller 214 is programmed to periodically and systematically operate the switch 214 such that the synchronization signal is properly inserted into the space provided by the compressor 210. In addition, the controller adds frame data information 213 to the sequence so that the compressor and expander can be properly synchronized. Preferably, the controller 216 is programmed with standard operating (default) parameters which determine, for example, the selection of the synchronization sequence and the interleave rate of the synchronization signal into the compressed encrypted signal. These default parameters may be optionally over-riden by user specified parameters provided by a keypad 218 or other such data entry device. Additionally, the keypad 218 may be used to input the encryption key that will be used by the encryptor 210 and the decryptor 238. Alternately, the positions of the encryptor 208 and the time compressor 210 may be interchanged. In this alternate embodiment, the digital information signal is first compressed and then encrypted prior to combination with the synchronization signal. However, the preferred embodiment is to first encrypt and then compress since this allows flexible re-formatting of the synchronization signal interleave rate (such as by the operator) without having to de-crypt the signal and re-compress to provide a different synchronization sequence or format.

Still referring to FIG. 2, the combined digital signal is routed to a transmitter 220. The transmitter 220 may be any suitable transmitter, and the description of any particular transmitter is not prerequisite to the full understanding the present invention. To transmit the message, the transmitter is temporarily coupled to the antenna 222 via the antenna switch 224. The antenna switch 224 is controlled by the controller 216 via the connection 226. Typically, the controller 216 operates the antenna switch 224 in response to an operator provided signal such as a push-to-talk (PTT) signal as is well known in the art. Normally, the transceiving device 200 operates in the receive mode with the antenna 222 coupled to a receiver 228 via the antenna switch 224. As previously mentioned in connection with the transmitter 220, any suitable receiver may be used in the transceiving device 200 of the present invention and the description of any particular receiver is not prerequisite to the full understanding the present invention. The receiver 228 provides the received signal to an optional error corrector 230. Those skilled in the art will appreciate that the received digital signal may have erroneous bits do to signal fading or other such adverse signal conditions. Accordingly, some receiver designers prefer to employ error correction at the receiver to improve the receiver's performance. Proper reception of the synchronization signal is particularly important since no information will be delivered to an operator until the receiver is "in sync". Thus, the present invention contemplates the optional use of an error corrector 230. If error correction is desired, the preferred embodiment of its incorporation is fully disclosed in U.S. Pat. No. 4,747,105 which is thereto as if fully set forth herein. Also, a preferred method of error correcting a pseudo-random synchronization sequence is described in U.S. Pat. No. 4,667,327.

The received sequence is next applied to a synchronization detector 232 and an expander 234. The synchronization detector 232 locates the synchronization signal in the received signal and provides a synchronization detect signal 236 if synchronization is achieved. Additionally, the synchronization detector provides framing information to the expander 234 so that the encrypted signal may be expanded back to its original form. As previously mentioned, the compressor periodically removed a bit or small group of bits so that the signal could be compressed. For proper reception, the synchronization signal must be extracted and the removed bits replaced in their proper position. This is accomplished in the expander 234 by predicting the removed bit from information gathered from the surrounding bits, which contain information of the logical state of the removed bit due to the redundant nature of the information signal. The expanded signal is received by a decryption device 238, which may be any suitable device capable of recovering the information signal from whatever encryption device 208 is used. Of course, if the encryptor 208 and the compressor 210 were reversed, the expander 234 and the decryptor 238 would also be reversed. The output of the decryptor 238 is the original information signal (plain text). If the information was data, the information may be displayed to the operator via any suitable display device 240. If the information signal was a voice signal, the digitized representation must be first converted back to an analog signal in a digital-to-analog (D/A) convertor 242. The now analog signal may be amplified in an audio amplifier 246 and provided to the operator via a speaker 248. In this way, messages may be transmitted and received using the transceiving device 200 of the present invention.

From the foregoing, it will be readily apparent to those of ordinary skill in the art that a receive-only device may be readily implemented using only the receive portion of FIG. 2, taken in conjunction with the detailed description above. Receive-only devices capable of operating in the secure communication system 100 of the present invention include, but are not limited to, data display pagers or terminals (using the data display 240), tone or tone-and-voice pagers (using the D/A 242, the audio amplifier 246 and the speaker 248) and, without the compress/expand and encryption, as a data detector in base equipment for data regeneration. The receive-only devices may be arranged in groups by judicious selection of operable synchronization sequences as described hereinabove in connection with the transceiving devices.

Figure 3:
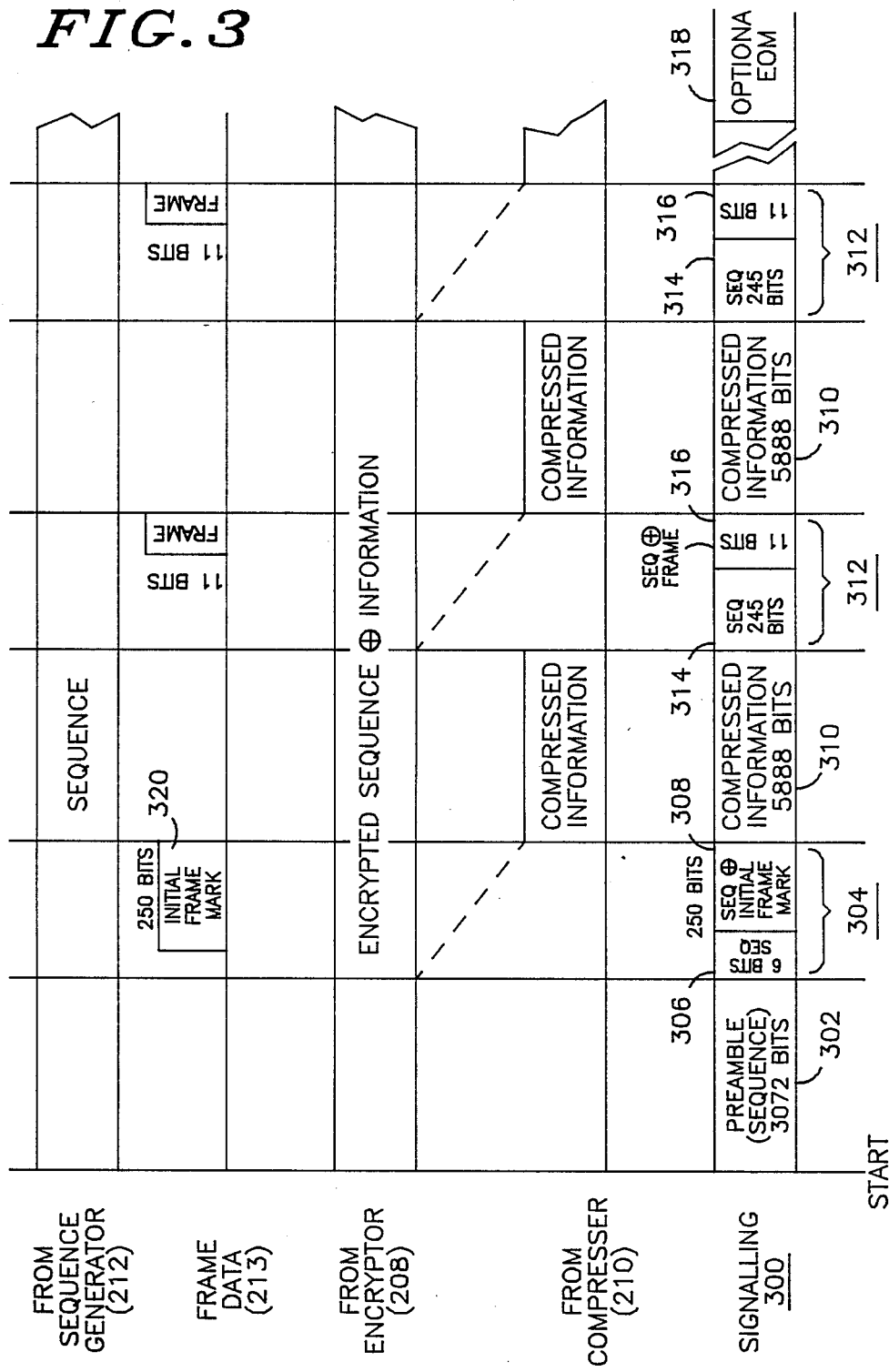
FIG. 3 is an illustration of the preferred signalling format of the present invention.

Referring now to FIG. 3, the preferred signalling format 300 is shown. Initially, a suitable preamble portion 302 is transmitted so that a receiver may acquire bit and sequence synchronization. Bit synchronization may be done by any of the many techniques known in the art. The length of the preamble is not critical, however, 3072 bits is preferred. The preamble is a portion of the synchronization sequence. Next, the initial frame mark data 308 for the expander 208 is sent in interval 304. Preferably this is composed of a continuation of the synchronization sequence 306 (6 bits), and the continued synchronization sequence exclusive ORed with a 250 bit sequence generated by an eight stage maximal length linear feedback shift register sequence generator (308). The use of the 250 bit sequence assures an accurate initial frame mark at the receiver. The 256 bit length of interval 304 is conveniently chosen to be compatible with succeeding synchronization and frame mark intervals (312). This length may be user selected as previously mentioned. Following the synchronization block 304, a portion of the information signal (now encrypted and compressed) is transmitted in block 310. Preferably, 5888 encrypted information bits are transmitted in the information portion 310, which together with the synchronization block 304, form a frame having a length of 6144 bits. Optionally, as previously mentioned, both the information portion and the frame length may be user selected. After the information block 310, and interleaved throughout the remainder of the message, is the synchronization and frame mark block 312. Preferably 312 is composed of a portion of the synchronization sequence 314 (245 bits), and the continued synchronization sequence exclusive ORed with an eleven bit frame marker pattern 316. Block 312 allows synchronization and frame marking to occur in the event that blocks 302 and 304 are not received. It also allows the continued detection of the synchronization to be verified. Preferably, the format 300 concludes with an end-of-message (EOM) portion 318, which preferably is used to rapidly squelch the receiver so that the operator does not hear a noise burst.

Figure 4:
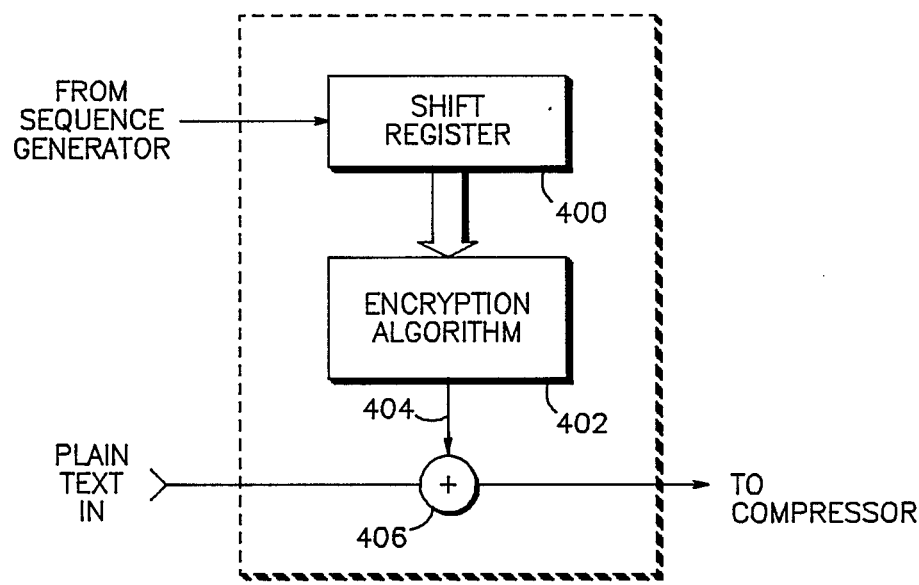
FIG. 4 is a block diagram illustrating the preferred mode of operation of the encryptor of FIG. 2.

Referring now to FIG. 4, the preferred embodiment of the encryptor 208 is shown. Preferably, the encryptor 208 operates in the Counter Addressing (CA) mode. As used herein, counter addressing means that the device implementing the selected encryption algorithm is fed a pseudo-random sequence to generate the key stream, which is used to encrypt the plain text message. In this way the encryption device is "addressed" by the pseudo-random sequence. Preferably, the pseudo-random sequence is provided by a maximal length linear feedback shift register (LFSR). The sequence provided by the LFSR is selected to be such that by knowing a small portion of the sequence, and the rules by which it was created, the entire sequence may be replicated at the receivers. Several such sequences are known in the art and the selection of any particular one is not essential to understanding the present invention.

Referring still to FIG. 4, the pseudo-random sequence is provided by the sequence generator 212 (see FIG. 2) and received by a shift register 400. Preferably, the shift register 400 is 64 bits in length, although other lengths may be used. The shift register 400 parallel loads its entire length as an address to the encryption device 402, which operates to implement any known or proprietary algorithm. The output of the encryption device 402 information is the key stream 404, which is added (modulo two) to the (plain text) signal in the adder 406. The output of the adder 406 is the cipher text stream, which is applied to the compressor 210 (see FIG. 2).

Figure 5:
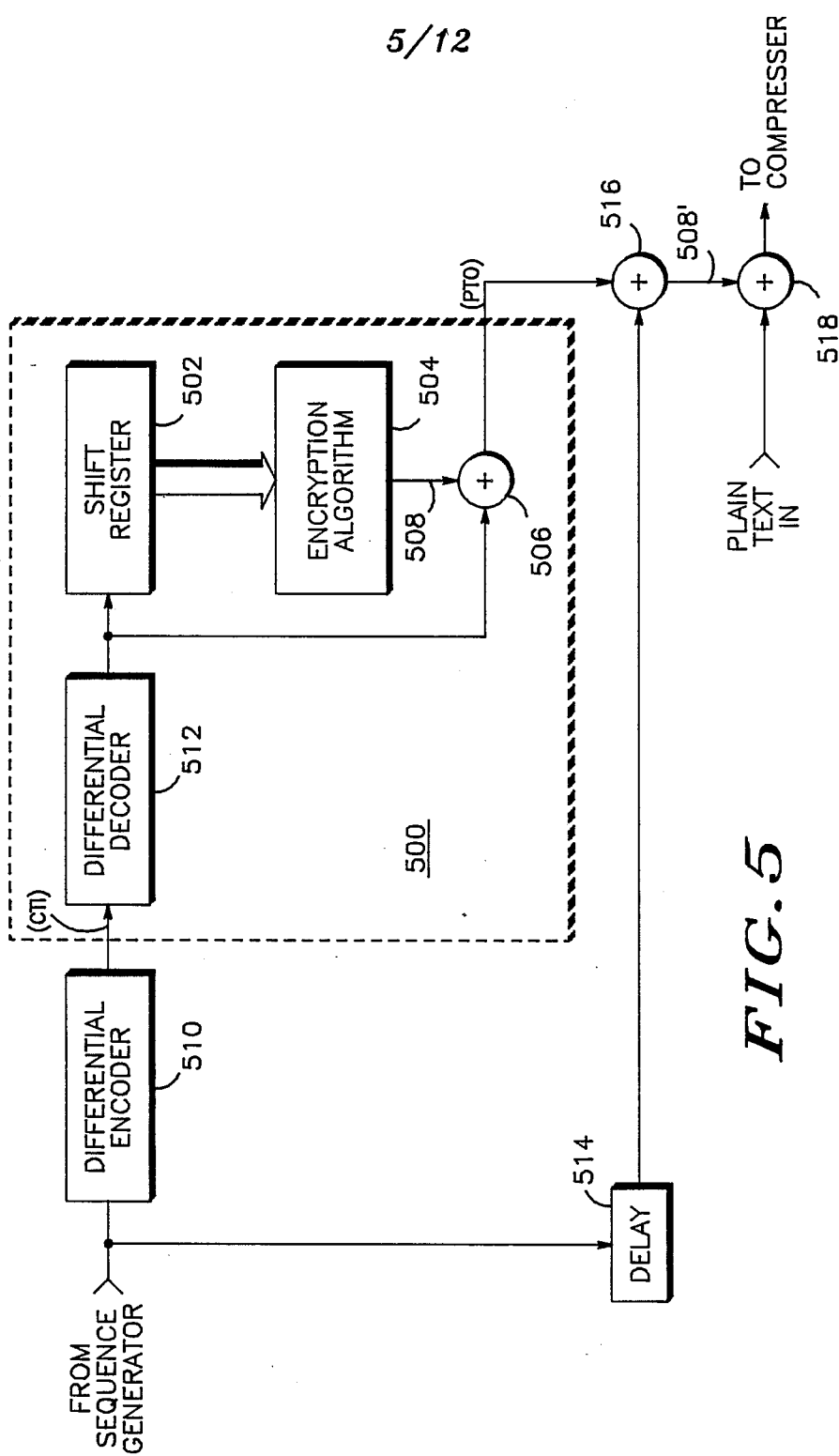
FIG. 5 is a block diagram illustrating how a CFB encryption device may be especially adapted to operate in the system of FIG. 1.

Referring now to FIG. 5, a block diagram illustrating an especially adapted CFB device is shown. A CFB device 500 in the receive mode is chiefly comprised of a shift register 502, an encryption device 504, and a modulo two adder 506. Typically, a differential decoder 512 is employed to avoid having to detect and compensate for phase inversions of the digital stream at the receiver. As is readily apparent, the differentially decoded input signal (CTI) is fed to the encryption algorithm 504, which produces a key stream 508. The key stream 508 is added to the differentially decoded input signal (CTI) in the adder 506, which provides the decrypted output signal (PTO). The well known error multiplication problem associated with CFB devices is readily apparent. Assume a single bit is erroneously placed in the shift register 502. This error will be applied the encryption algorithm 504 N times, where N is the length of the shift register. Thus, the error is multiplied by the length of the shift register.

Historically, providers of secure communication equipment developed proprietary encryption algorithms for use with their equipment. This resulted in a proliferation of encryptors each shielded in secrecy to maintain the security of the communication system. Those of ordinary skill in the art will understand that in both FIGS. 4 and 5, the actual encryption device may be the same, however, their modes of operation are entirely different. The encryption device is typically realized on a small hybrid device or incorporated into an integrated circuit (IC). Such implementation practice protects the security of the system by making it difficult to analyze the operation of the encryptor. However, the encryptor sealed within the IC or hybrid device is forever constrained to operate only a selected mode. The present invention contemplates that it may be inconvenient to re-design encryptors to operate in the preferred CA mode of operation. Additionally, the present invention seeks to avoid a further proliferation of new encryptors for use in the secure communication system 100 of the present invention. Thus, the present invention contemplates especially adapting CFB devices for use with the present secure communication system.

Still referring to FIG. 5, the LFSR sequence from the sequence generator 212 is operated upon by a differential encoder 510. The purpose of the differential encoder 510 is to counter the effect of the differential decoder 512. The overall result is that differential decoder 512 is effectively removed from the CFB device and reduces the differential encoder and decoder (510 and 512) to mere digital delay elements. Of course, if a particular CFB device 500 did not employ a differential decoder 512, the differential encoder 510 would not be required. This delayed sequence is provided to the shift register 502. The sequence is applied in parallel to the encryption algorithm, which effectively "addresses" the device as seen in FIG. 4. However, the key stream 508 is added to the sequence in the adder 506 and not the plain text message as required. Accordingly, the present invention subtracts out the appropriately delayed (delay 514) sequence (to compensate for the differential decoder and encoder delay) from the key stream in the subtractor 516. Thus, the key stream 508' is added to the plain text signal in the adder 518, which provides the cipher text output to the compressor of FIG. 2. In this way, an existing CFB device 500 operated in the receive mode may be adapted for use in the secure communication system 100 of the present invention.

Figure 6:
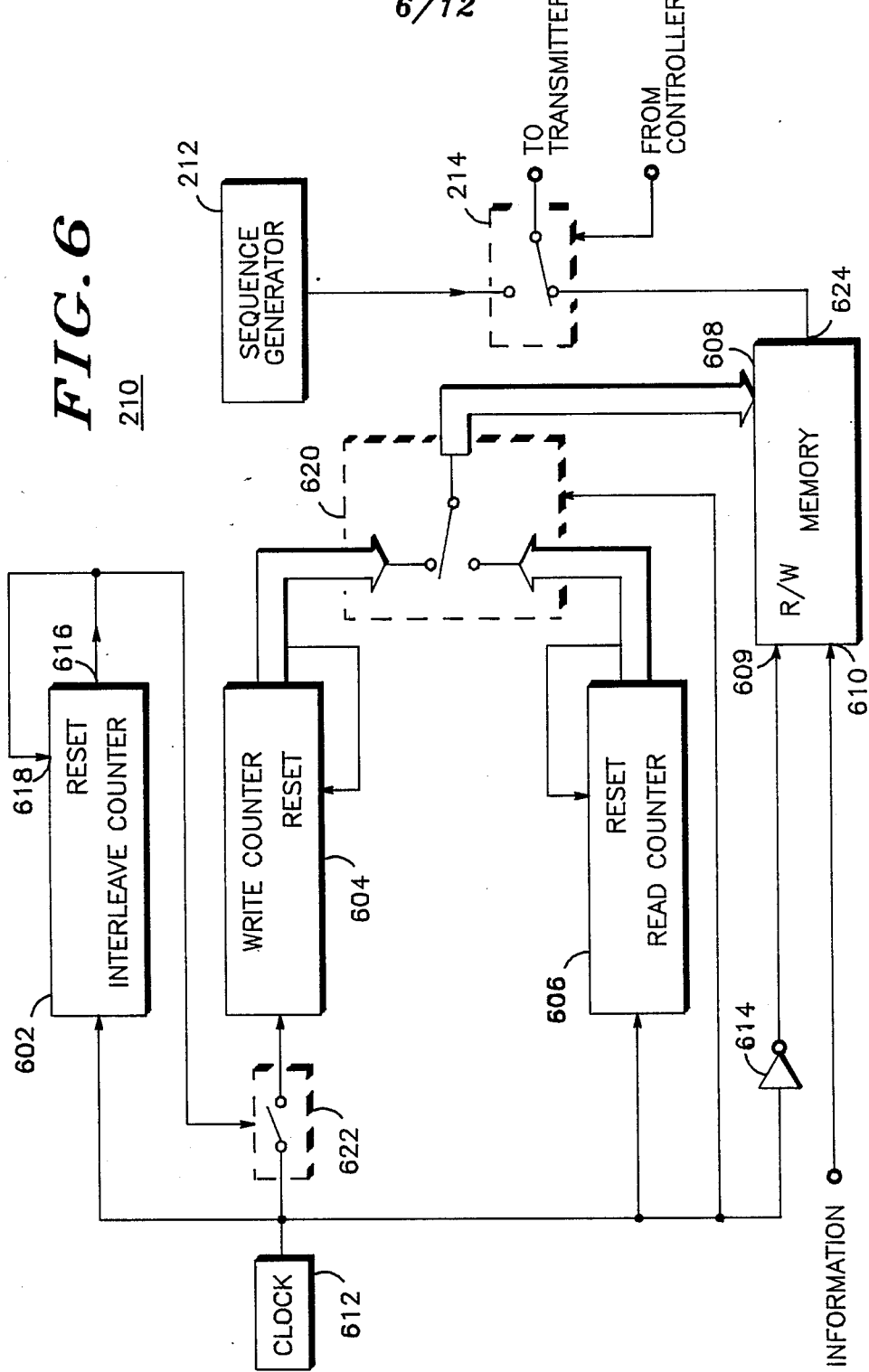
FIG. 6 is a block diagram of the compressor of FIG. 2.

Referring now to FIG. 6, there is shown the digital compressor 210 of FIG. 2. The compressor 210 is comprised chiefly of an interleave counter 602, a write counter 604, a read counter 606 and a random access memory (RAM) 608. The length of the interleave counter 602 is defined as being the interleave count (N). The write counter 604, the read counter 606 and the RAM 608 are all of a common length referred to as the address count (S), and is equal to the number of data or synchronization bits that will be inserted into the digital information stream. In the preferred embodiment, the interleave count (N) equals 24 and the address count (S) equals 256, although the compressor 210 of the present invention is not constrained to these values and any other values may be selected without departing from the teachings of the present invention. The interleave counter 602, the write counter 604, and the read counter 606 may be any suitable counter and may be implemented in integrated circuit (IC) form or their function may be incorporated as an internal register of a microprocessor or the like. Similarly, the RAM 608 can be any suitable memory means having a size (S) that is equal to the amount of data to be inserted and transmitted. As is known, certain microprocessors have an internal RAM area, and provided the RAM is of sufficient size, all major components of the compressor 210 may reside within a single microprocessor chip.

Operationally, prior to transmission, all counters are preferably reset so that the memory addresses start at zero. The information signal to be transmitted (be it data or digitized voice) is presented to the input port 610 of the RAM 608, and is synchronized to a clock 612. The interleave counter 602 and the write counter 604 begin "up-counting" in synchronization to the clock signal 612. That is, for each clock pulse, the count of the pulses is incremented by a predetermined value (one in the preferred embodiment). The read counter 606 also increments from the clock signal 612. Both the read counter 606 and the write counter 604 reset when they reach the maximum count of S. The write counter 604 and the read counter 606 provide the addresses for the RAM 608. As each bit of information is clocked into the RAM 608, a write address is received from the write counter 604 via the switch 620. The switch 620 is controlled by the clock 612, which is also coupled to the RAM's read-write (R/W) control port 609 through the inverter 614. If the memory's R/W signal were inverted, the inverter 614 would not be required. Thus, when the clock signal changes state, the RAM 608 switches to the read mode, and a read address is provided from the read counter via the switch 620.

As previously mentioned, the interleave counter 602 has length N. Accordingly every N clock cycles a pulse will be presented at the interleave counter output 616. This pulse is routed to a reset port 618 of the interleave counter 602, which resets the interleave counter to a logical zero state to resume up-counting again. The output port 616 of the interleave counter 602 also controls the switch 622. When the interleave counter 602 asserts its output pulse, the Nth clock pulse is prevented from reaching the write counter 604 due to the opened switch 622. This keeps the write address the same for two consecutive clocks causing the previous bit to be written over before it is read. The effect is that every Nth bit of the information signal presented at the RAM input port 610 is discarded. For N consecutive clock cycles the read and write addresses are the same. In the compressor, it doesn't matter whether the memory 608 is written to or read from first, however, in the preferred embodiment of the present invention, the memory is first written to. This is done by having counters 602, 604 and 606 increment on the rising edge of the clock and having the switch 620 select the write counter with the memory in the write mode when the clock is a logical one. Other combinations are possible. The first S bits to be read out of the memory 608 are replaced by the synchronization information. The synchronization sequence may be inserted by the switch 214 from the sequence generator 212. Following this, the information signal travels through the RAM 608 on a first-in-first-out (FIFO) basis until all the digital information is sent. In this way the synchronization data may be transmitted after $(N-1) \times S$ bits (5,888 bits in the preferred embodiment).

Referring now to FIG. 7, in conjunction with FIG. 6, an illustration of the compressor 210 of FIG. 2 is shown for the simple case of S=9 and N=6. The RAM 608 addresses are arranged from left to right across the top. The clock cycles from the clock 612 are listed sequentially along the left margin. The output 624 of the RAM 608 is illustrated down the right hand margin. since S=9, the addressable RAM space is 0-8 inclusive. For illustration purposes, the clock has been selected to start arbitrarily at zero and may increase without bound. For each clock cycle a read address has been illustrated by "R" and a write address illustrated with the "W". For those cases where the read and write addresses are identical for a given clock cycle, a "WR" is listed in the corresponding column. This notation indicates that the memory 608 is first written to. As previously mentioned, the counters are preferably reset to zero before the process begins. Accordingly, the output of the RAM 608 for bits 0–8 of the RAM 608 are not used so the synchronization signal is transmitted instead. The compressed digital waveform is read out beginning with clock cycle 9. At that time the RAM write address counter 604 has incremented to 8 while the read address counter 606 has been reset back to zero. Therefore, the bit at address zero is read out from the RAM 608 on clock cycle 9 as is indicated in the "output" column. In a similar manner, bit 1 is read out on clock cycle 10, bit 2 on clock cycle 11, and so on. Viewing down the "output" column then it can be seen that bits 5, 11, 17, 23, 29, 35, 41, 47 and 53 have all been deleted from the output stream. The absence of these 9 bits made space for the 9 synchronization bits that were transmitted on clock cycles 0–8. Accordingly, the digital information signal has been compressed to allow the insertion of the synchronization sequence.

Figure 8:
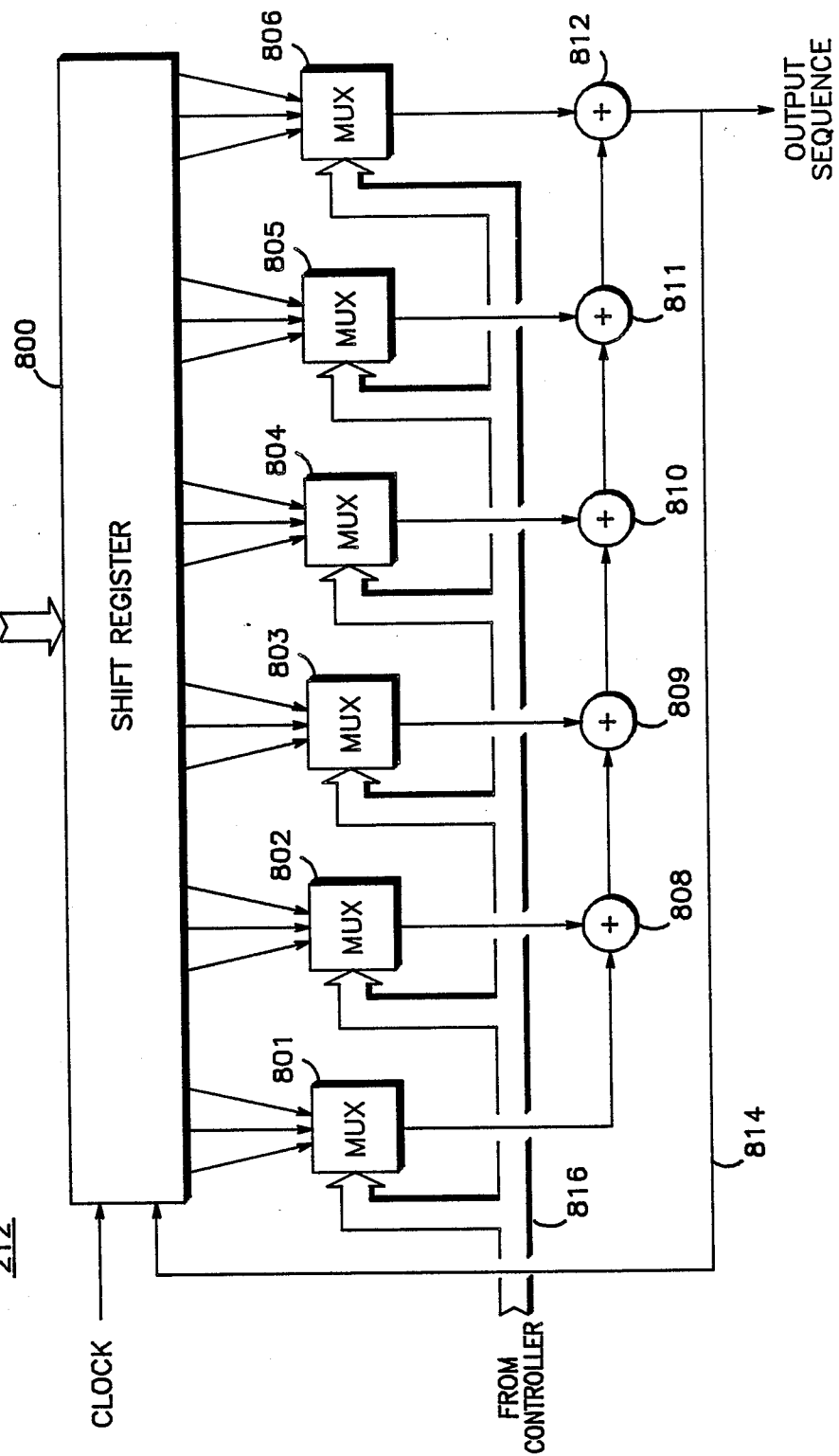
FIG. 8 is a block diagram of the sequence generator of FIG. 2.

Referring now to FIG. 8, the preferred embodiment of the sequence generator 212 of FIG. 2 is shown in block diagram form. The sequence generator 212 provides both the synchronization signal that is interleaved with the encrypted information signal and the pseudo-random "address" signal to the encryption device 208. Preferably, the sequence generator 212 is a maximal length LFSR. Mathematically, the LFSR defines an Nth degree polynomial (where N is the length of the LFSR) with one coefficient for each "tap" or output bit utilized to form the feedback signal. Basically, the preferred sequence generator is comprised of a shift register 800, a plurality of multiplexers 801–806 (or suitable equivalent) and a plurality of modulo two adders 808–812. Each of the multiplexers are coupled to several output bits (taps) of the shift register, one of which is selected via a control bus 816 from the controller 216 of FIG. 2. Initially, the shift register is loaded with an initialization vector in parallel or serially, which comprises a predetermined N-bit digital word. The initialization vector may be pre-stored in the transceiver or may be operator selected such as via the keypad 218. The sequence generator operates to add (modulo two) the selected taps in the adders 808–812. The final adder 812 provides a feedback signal 814, which is also the output of the sequence generator 212. By changing the selected taps via the multiplex control bus 816, different sequences may be generated for use as, for example, different group codes.

To be suitable for use in the present invention, the sequence provided must satisfy three major conditions. First, the polynomial must be irreducible. That is, the polynomial must be divisible only by itself and one. To be irreducible, the number of taps used must be an even integer (6 in the preferred embodiment). Also, irreducibility is required for the LFSR to be maximal length, which is the second condition. Lastly, the polynomial must be self-orthogonal. This is of particular importance if error correction is to be used. A polynomial must have less than 10 taps to be self-orthogonal. In the preferred embodiment of the sequence generator 212, the shift register has a length of 64 bits, thus providing a 64th degree polynomial. Six taps are used to create the sequence. A 64 bit maximal length LFSR will produce a sequence having $1.84 \times 10^{19}$ bits. At 12 kHz, it would take $48.7 \times 10^6$ years for the sequence to repeat. Thus, the LFSR of the present invention provides a pseudo-random, noise-like signal suitable for use in a secure communication system.

Figure 9:
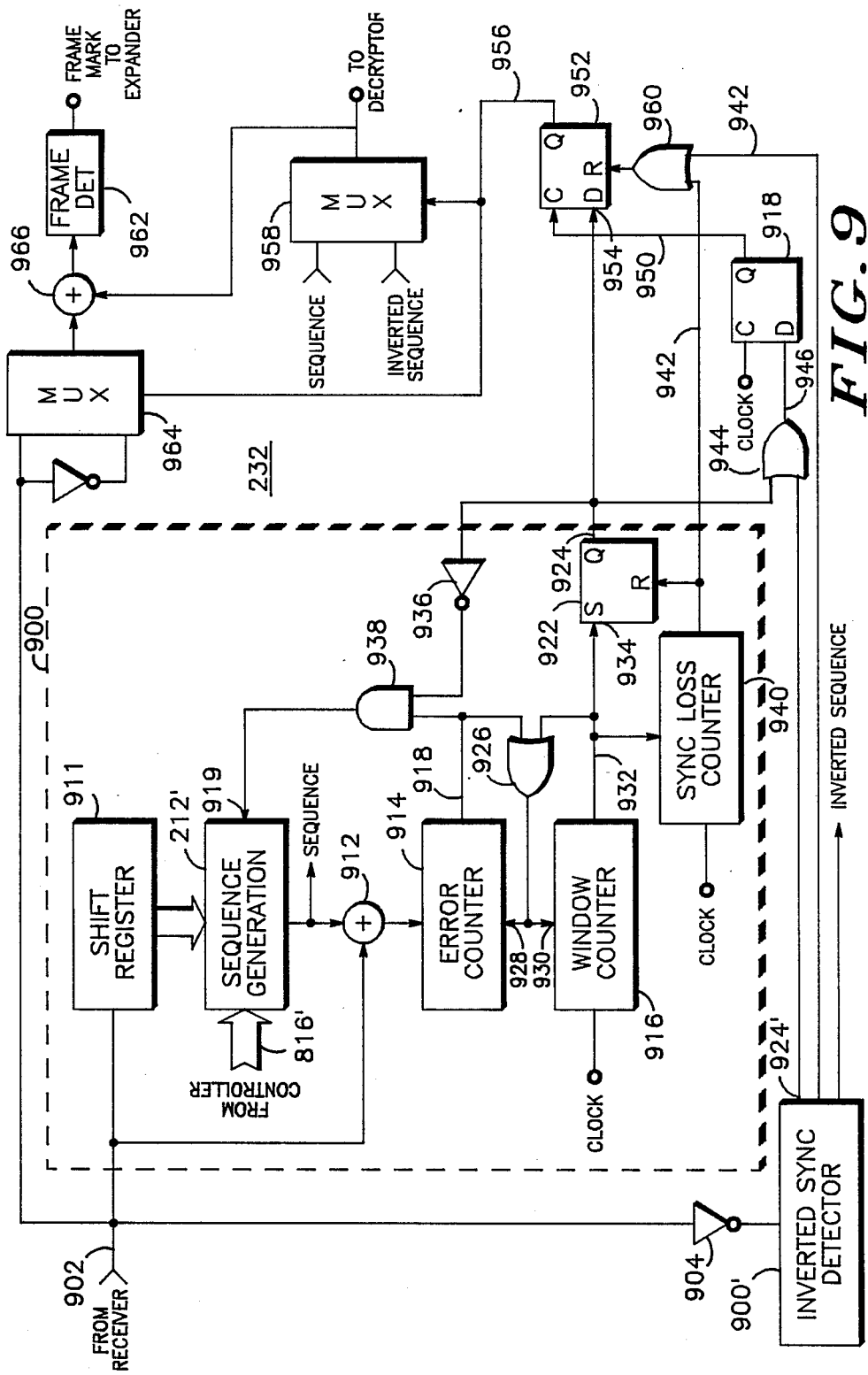
FIG. 9 is a block diagram of the synchronization detector of FIG. 2.

Referring now to FIG. 9, the synchronization detector 232 of FIG. 2 is shown. The detector 232 is comprised chiefly of a non-inverted detector 900, an inverted detector 900' and assorted logic which is used to determine whether the inverted or non-inverted detector has found the synchronization sequence. The received data bits enter via the connection 902 and are supplied to the inverted detector 900' via the inverter 904, and is directly supplied to the non-inverted detector 900. The reason for this is that the present invention does not employ differential encoders and must recover the actual logic level. Those of ordinary skill in the art will readily appreciate that phase inversions are a common data transmission problem and that both phases must be investigated to assure synchronization.

Still referring to FIG. 9, the operation of the non-inverted detector 900 may be described. The synchronization signal and the data signal are received by a shift register 911. The shift register 911 parallel loads at least a portion of the received data stream to a sequence generator 212'. The sequence generators 212 and 212' are preferably identical since the sequence must be known by both the transmitter and receiver to correctly decode the data on the channel. Additionally, the same taps for the sequence must be selected via the mux control bus 816' if the detector is to locate the synchronization sequence. Those skilled in the art will appreciate that if the synchronization bits that define the logical state of the sequence generator have been properly loaded into the sequence generator 212', both of the sequence generators will be providing the exact same sequence. The locally generated synchronization sequence provided by the generator 212' and the received data stream are compared in an adder 912. Preferably, the adder 912 is a modulo two adder and may be represented as an exclusive OR gate such as an MC14070B manufactured by Motorola, Inc., or its functional equivalent. If the local sequence and the received sequence are identical, the output of the adder 912 will be at a logical "zero" state. Alternately, if the local synchronization sequence and the data stream are dissimilar the output of the adder 912 will be at a logical "one" state. The locally generated sequence and the received sequence may not be identical for several reasons, including, an error in the received data stream, or that the sequence generator 212' has not been loaded with synchronization bits from the received data stream.

When the output of the adder 912 is at the logical one state, an error has been detected between the received data steam and the locally generated sequence. This output is coupled to an error counter 914, which counts the number of times that the local sequence and the received sequence do not match. Contemporaneously, a second counter 916 is counting clock cycles to form a "window" counter as is known in the art. If the error counter 914 reaches its predetermined count limit, it will generate an output pulse on its output line 918. Output line 918 is operably coupled to the parallel load port 919 of the sequence generator 212' through an AND gate 938. The other input of the AND gate 938 is connected to an inverter 936, which is coupled to the synchronization detect output 924 of the flip-flop 922. If the output 924 of the flip-flop 922 is at a logical zero state, synchronization has not been detected. These connections operate to control when the sequence generator 212' is reloaded with more received data bits from the shift register 911. Preferably, the flip-flop 922 is an MC14013B, manufactured by Motorola, Inc., or its functional equivalent. Lastly, the signal 918 is coupled to an OR gate 926, which in turn is a reset port 928 on the error counter 914 and a reset port 930 on the window counter 916. These connections operate to reset the counters to a logical zero state so that the detection process may begin again.

Assuming now that the window counter 916 reaches its predetermined count threshold prior to the error counter 914 asserting its output signal 918, the synchronization detect signal 924 will be asserted when the window counter 916 asserts its output control line 932. The control line 932 is coupled to the "set" port 934 of the flip-flop 922, which operates to raise the Q output port 924 to a logical one level, thereby asserting the synchronization detect signal, which is coupled to polarity detection logic to be hereinafter fully described. The asserted synchronization detect signal inhibits any further parallel loads of the sequence generator 212' by placing a logical zero on the AND gate 938 via the inverter 936. The control signal 932 is also coupled to the OR gate 936, which resets the error counter 114 and the window counter 916 via reset ports 928 and 930 respectively.

Once the sequence generators 212 and 212' are "in sync", some means must be provided to detect sync loss and to return to the detection mode to attempt to recover synchronization. In the preferred embodiment of the present invention, a synchronization loss signal 942 is provided by a synchronization loss counter 940. Operationally, the synchronization loss counter 940 counts clock pulses and asserts its output signal 942 when it reaches a predetermined threshold. Normally, the synchronization loss counter synchronization 940 is reset by the window counter via signal 932. This is accomplished by detecting the short periods of sequence inserted throughout the message. However, in the event that these synchronization sequences are not detected, the synchronization loss counter 940 will reach its predetermined threshold before being reset and will assert the signal 942. To increase the probability of the window counter 916 reaching its predetermined count on a valid sync sequence corrupted by noise, the error counter 914 count limit is increased once sync has been detected. This prevents the sync loss counter 940 from reaching its predetermined count and resetting the sync detect latch 922 under noisy signal conditions. Synchronization loss signal 942 is coupled to the reset port 920 of the flip-flop 922. When asserted, the synchronization loss signal 942 operates to reset the flip-flop 922 thereby enabling the error counter 914 to parallel load the sequence generator 212' via the AND gate 936. Also, a predetermined end-of-message signal could be transmitted and detected to resume parallel loading. Of course, any combination of these techniques may be used in any particular implementation.

The parallel loading by the present invention, of the sequence generator 212' allows the entire length of the shift register 911 to be loaded in the time it takes to clock in one bit of the received data stream. Accordingly, if the error counter 914 reaches its predetermined threshold in N clock cycles (or less), where N is the length of the shift register 911, the receiver will not "lose" any received bits while determining whether or not the receiver is synchronized. In the preferred embodiment of the present invention, the length of the shift register 911 is, at a minimum, equal to the length of the window counter 916. This "covers" any locally generated errors shifted into the sequence generator shift register during the verification interval (defined by the length of the window counter; 48 bits in the preferred embodiment) without having to reload or "clear" all of the sequence generator. Therefore, the minimum length of the transmitted synchronization sequence is equal to the length of the sequence generator 212' and the window counter 916. In the preferred embodiment, 256 bits are transmitted, which is approximately twice the minimum length. This allows for multiple synchronization attempts, per any given time period, than that of the prior art. As previously mentioned, the preferred sequence appears random or pseudo-random and will quickly diverge to a noiselike signal if the receiver is not synchronized. Typically, the error signal 918 may be asserted (on the average) in 2X bits, where X is the error threshold (X=4 in the preferred embodiment and one bit equals one error). Thus, the parallel loading of the present invention affords both a time savings and improved performance over synchronization detectors of the prior art since the sequence generator 212' need not be completely reloaded with bits from the incoming data stream after each synchronization attempt.

The inverted detector 900' operates in the same manner described above on the inverted information supplied by the inverter 904. The non-inverted detect signal 924 and the inverted detect signal 924' are ORed together (OR gate 944) to provide a signal detection signal 946. This signal (946) is re-clocked in the flip-flop 948, which provides a trigger signal 950 to the polarity latch 952. The data (D) input 954 of the latch 952 is coupled to the non-inverted detect signal 924. Operationally, when either detector asserts its detect signal the trigger signal 950 is asserted on the next clock cycle. The logical state of the non-inverted signal 924 is investigated by the latch 952 by latching the state of the non-inverted signal to the Q output of the latch 952. Thus, if a trigger signal is generated and the logical state of the non-inverted signal is zero, the inverted detector 900' must have found the synchronization sequence. Conversely, if the logical state of the non-inverted signal is one, the detector 900 must have found the synchronization sequence. The polarity signal 956 is coupled to a multiplex device 958, which selects either the inverted or non-inverted data signal for further processing and reception. Lastly, the loss of sync signals 942 and 942' are ORed together in the OR gate 960, which resets the polarity latch 952. Those skilled in the art will understand that there are many other combinations of logic elements that may be used to determine the polarity of the received signal and any of such circuits are suitable for use in the present invention.

To allow detection of the frame information for the expander, FIG. 9 also includes frame detector 962. In the preferred embodiment, this detector operates to recover both the 250 bit initial frame mark and subsequent 11 bit frame marks using any of the methods known to one skilled in the art. Since in the preferred embodiment, the frame marks are exclusive ORed with the synchronization sequence, this sequence, with the proper polarity selected, must be removed. This is accomplished by selecting signal 902 or its inverse in the multiplexer 964 by the polarity detect signal 956, and removing the polarity selected synchronization sequence with exclusive OR gate 966. The output of 966 is applied to the frame detector 962.

Figure 10:
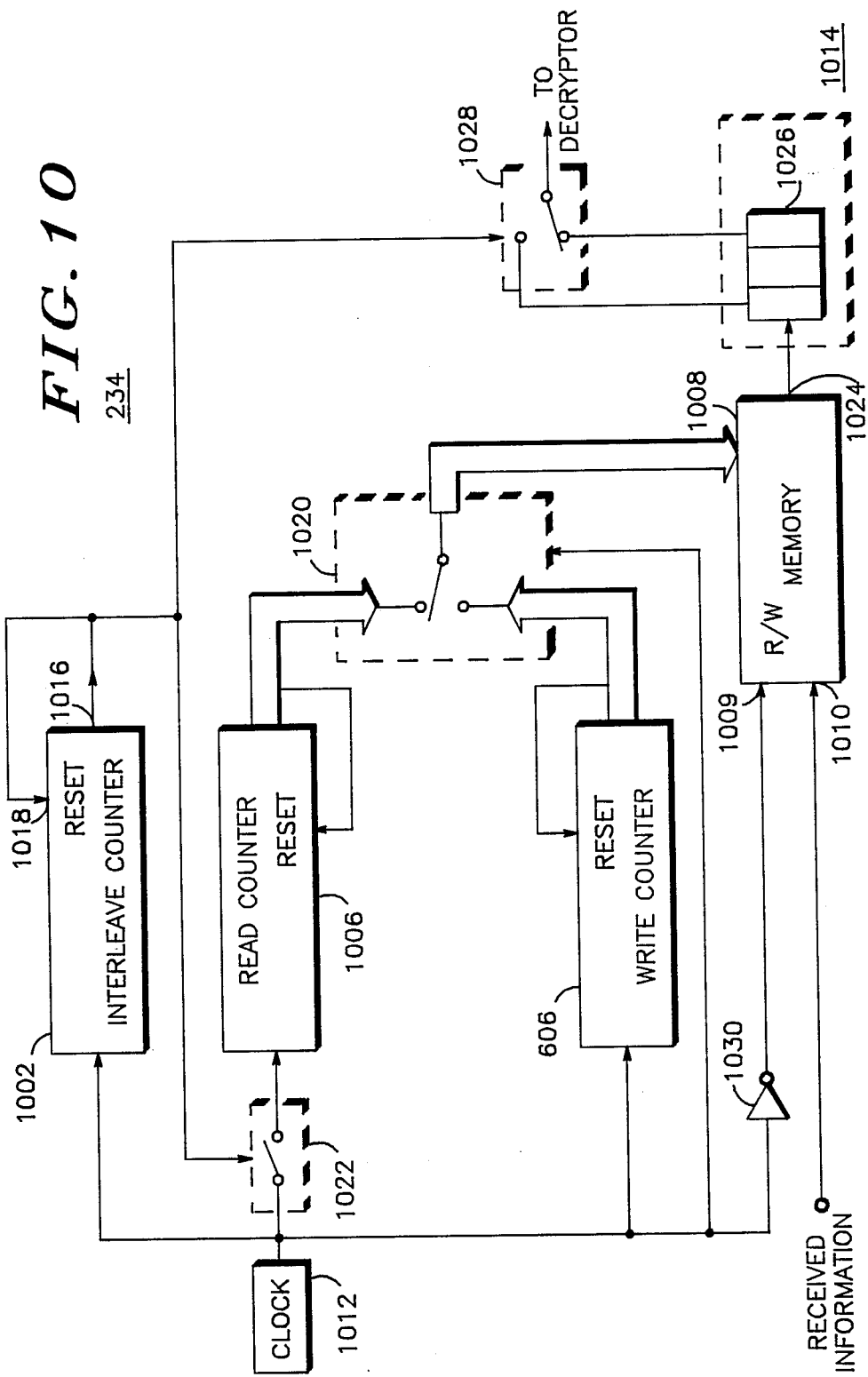
FIG. 10 is a block diagram of the expander of FIG. 2.

Referring now to FIG. 10, the preferred embodiment of the expander 234 of FIG. 2 is shown. As is readily apparent, the expander 234 is substantially similar to the compressor 210, which simplifies designs and may allow the compressor and expander to share common circuitry. Of course, for full duplex operation, a transceiver 200 would require one each of the compressor 210 and the expander 234.

To describe the operation of the expander 234, it is assumed that the first S bits of the transmitted digital signal (sync data) have been received and removed from the information bits, such as by discarding them, thereby providing information bits synchronized to the clock 1012. This is done using the frame mark detected as shown in FIG. 9 and described above. The information (cipher text) is written into the RAM 1008 on a first-in-first-out basis using the addresses provided by the write counter 1004 and the information is read out of the RAM 1008 using the addresses provided by the read counter 1006. The information bits are read out $N-1$ bits at a time and the Nth bit is added by the predictor 1014.

As described in conjunction with the compressor, for N consecutive clock cycles the read and write addresses are the same. In the expander, it is important that the RAM is first written to before being read. Accordingly, the present invention increments the counters 1002, 1004 and 1006 on the rising edge of the clock, and the switch 1020 selects the write counter with the memory in the write mode when the clock in logical one. Of course, other combinations are possible to achieve the same result.

The predictor 1014 is comprised of a shift register 1026 and a switch 1028 and is best described as a digital predictor, which reinserts the removed Nth bit at the transmitter. Those skilled in the art will appreciate that merely inserting a random bit would result in a 50% probability of error. Therefore it is desirable to employ a predictor to improve the probability of making a correct decision. This is particularly advantageous for digitized voice information which has been encoded using a Continuously Variable Slope Delta-Modulator (CVSD). CVSD coded voice has a desirable property of having a likelihood of consecutive logical ones and logical zeros. Therefore, a very simple predictor can be implemented wherein every Nth bit, the second predecessor (in time) is inserted. Of course, other predictors may be used (for example using the 3rd or 4th preceding bits, or combination of bits with a ROM look-up table), without departing from the teachings of the predictor 1014 of the present invention.

In operation, the predictor 1014 accepts the information from the RAM 1008 via an output port 1024. Ordinarily, the bit just received at the shift register 1026 is routed (via the switch 1028) to the decryptor 238. However, when the interleave counter 1002 asserts an output pulse (every Nth clock) the switch 1028 routes the second predecessor in time (i.e., the bit that was outputted two bits previous). This simple predictor increases the probability of a correct decision to 75%, which provides a suitable intelligibility rate for digitized voice.

Referring now to FIG. 11, an illustration of the expander 234 of FIG. 2 for the simple case of S=9 and N=6 is shown. As in FIG. 7, the RAM 1008 addresses are listed from left to right across the top and the clock cycles 1012 are listed sequentially from zero through 55. The 9 synchronization bits are presumed to have been discarded and that the incoming digital waveform is now synchronized to the clock 1012. At a clock cycle zero, the 0th received bit is written into the RAM 1008 on the rising clock edge and is read out on the next falling clock edge. This continues for bits 1 through 4 until the 5th received bit is encountered. At clock cycle 5, a bit is inserted into the output stream by the predictor circuit 1014 (see FIG. 10). This predicted bit replaces the first deleted bit at the expander as shown in FIG. 7. At clock cycle 6, the 5th received bit is read out as an output. As can be seen, received bits 6–9 are read out in a similar manner on clock cycles 7–10 respectively. Thereafter, another predictor bit is inserted at clock cycle 11. This expansion process repeats until clock cycle 54. Following clock cycle 54, received bits 45–53 inclusive are discarded and the received bit 54 is read out. Bits 45–53 are discarded because they represent the next received signalling word and not compressed digital information.

Figure 12:
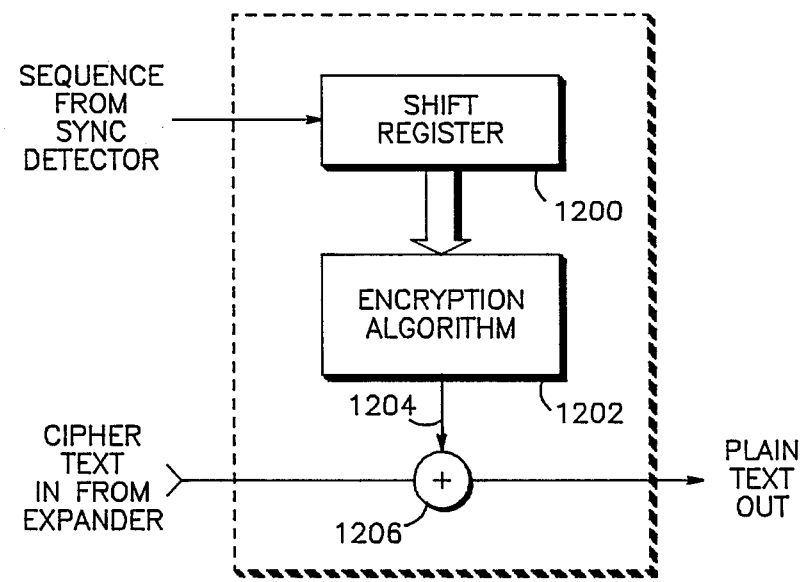
FIG. 12 is a block diagram illustrating the preferred mode of operation of the decryptor of FIG. 2.

Referring now to FIG. 12, the preferred embodiment of the decryptor 238 is shown. Preferably, the decryptor 238 operates in the Counter Addressing (CA) mode as does the encryptor 208. As is readily apparent, the decryptor 238 and the encryptor 208 are substantially similar, and in fact, many transceiving devices share the circuitry to reduce cost and size of the transceiver. Of course, for a full duplex device, one each of the encryptor 208 and the decryptor 238 would be required.

Referring still to FIG. 12, the pseudo-random sequence is provided by the synchronization detector 232 (see FIG. 2), which is received by a shift register 1200. Preferably, the shift register 1200 is 64 bits in length, although other lengths may be used. The shift register 1200 applies its entire length as an address to the encryption device 1202, which operates to implement any known or proprietary algorithm. The output of the encryption device 1202 is the key stream 1204, which is added (modulo two) to the cipher text provided by the expander 234 in the adder 1206. Those skilled in the art understand that, in modulo two arithmetic, adding and subtracting are implemented in the same way. That is, adding and subtracting are the same for modulo two arithmetic. Operational understanding is facilitated by recalling that the key stream 404 was added to the plain test in FIG. 4 to create the cipher text. Thus, if the regenerated key stream 1204 is subtracted from the cipher text, the result will be the original plain text. Clearly, the regenerated key stream 1204 will be identical to the key stream 404 if and only if the same sequence is applied to the shift register 1200 (i.e., the receiver is in sync) to address the same encryption algorithm 1202. Thus, output of the adder 1206 is the original plain text message, which may be applied any suitable information presentation device (see FIG. 2).

Figure 13:
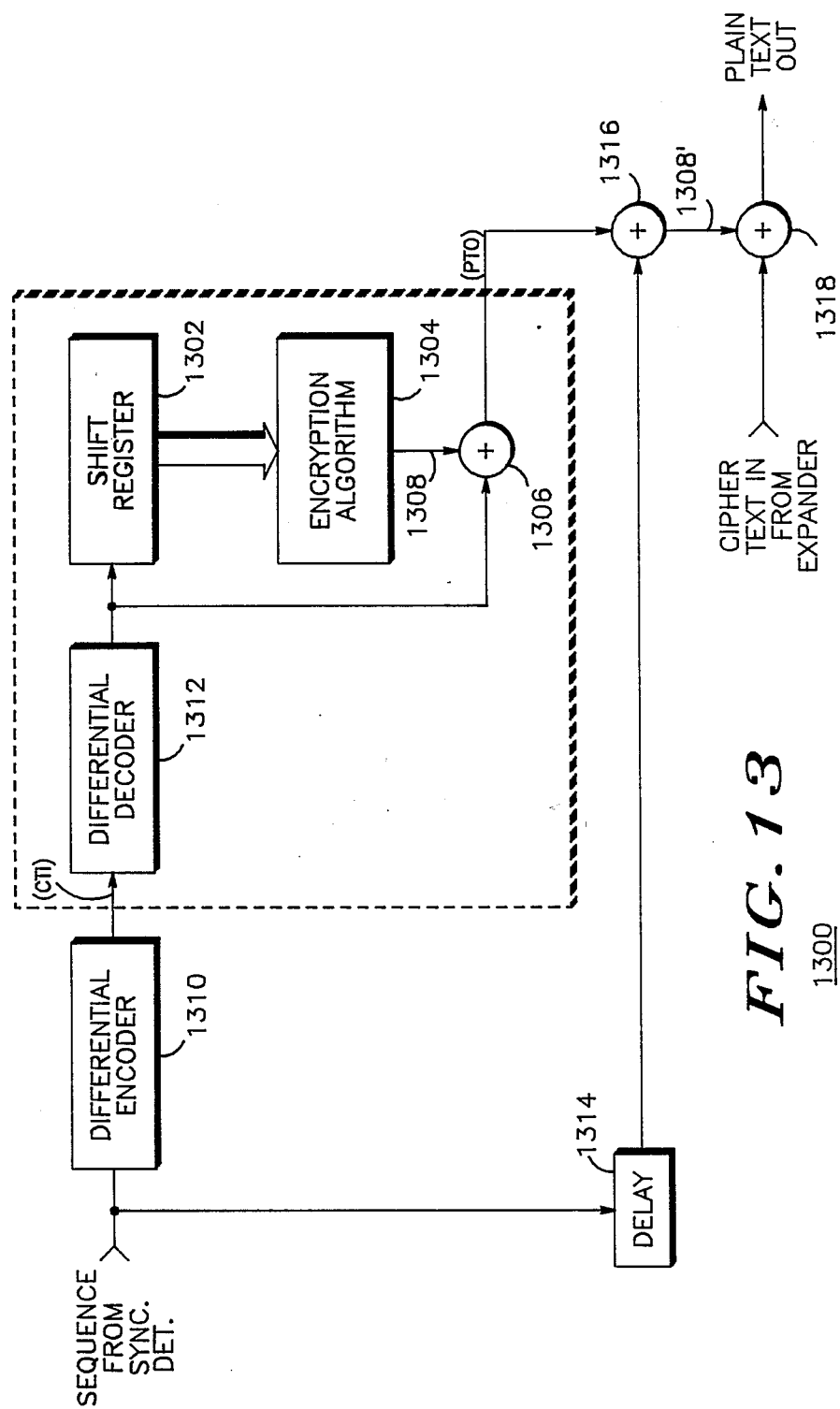
FIG. 13 is a block diagram illustrating how a CFB decryption device may be especially adapted to operate to operate in the system of FIG. 1.

Referring now to FIG. 13, a block diagram illustrating an especially adapted CFB device 1300 is shown. A CFB device 1300 in the receive mode is chiefly comprised of a shift register 1302, an encryption device 1304, and a modulo two adder 1306. Typically, a differential decoder 1312 is commonly employed to avoid having to detect and compensate for phase inversions of the digital stream at the receiver. As is readily apparent, the differentially decoded cipher text input (CTI) signal is fed to the encryption algorithm 1304, which produces a key stream 1308. The key stream 1308 is added to the differentially decoded input signal in the adder 1306, which provides the decrypted output signal (PTO). The well known problem with CFB devices is the error multiplication problem. Assume a single bit is erroneously placed in the shift register 1302. This error will be applied into the encryption algorithm 1304 N times, where N is the length of the shift register. Thus, the error is multiplied by the length of the shift register.

As previously mentioned, historically secure communication equipment providers developed proprietary encryption algorithms for use with their equipment. This resulted in a proliferation of encryptors each shielded in secrecy to maintain the security of the communication system. Those of ordinary skill in the art will understand that in both FIGS. 12 and 13, the actual device may be the same, however, their modes of operation are entirely different. Typically, the encryption device is realized on a small hybrid device or incorporated into an integrated circuit (IC). Such implementation practice protects the security of the system by making it difficult to analyze the operation of the encryptor. However, the decryptor sealed within the IC or hybrid device is forever constrained to operate only a selected mode. The present invention contemplates that it may be inconvenient to re-design decryptors to operate in the preferred CA mode of operation. Additionally, the present invention seeks to avoid a further proliferation of new decryptors for use in the secure communication system 100 of the present invention. Thus, the present invention contemplates especially adapting CFB devices for use with the present secure communication system.

Still referring to FIG. 13, the LFSR sequence from the synchronization detector 232 is operated upon by a differential encoder 1310. The purpose of the differential encoder 1310 is to counter the effect of the differential decoder 1312. The overall result is that differential decoder 1312 is effectively removed from the CFB device 1300 and reduces the differential encoder and decoder (1310 and 1312) to mere delay elements. Of course, if a particular CFB device did not employ a differential decoder 1312, the differential encoder 1310 would not be required. The delayed sequence is provided to the shift register 1302. The sequence is applied in parallel to the encryption algorithm, which effectively "addresses" the device as seen in FIG. 12. However, the key stream 1308 is added to the sequence in the adder 1306 and not the cipher text message as required. Accordingly, the present invention subtracts out the appropriately delayed (delay 1314) sequence (to compensate for the differential decoder and encoder delay) from the key stream in the subtractor 1316. Thus, the key stream 1308' is added to the cipher text signal in the adder 1318, which provides the plain text output as seen in FIG. 2. In this way, an existing CFB device 1300 operated in the receive mode may be adapted for use in the secure communication system of the present invention.

In summary, a synchronous secure communication system is provided by the present invention wherein an information signal is encrypted in an encryption device operating in the counter addressing mode. The encrypted signal is compressed to allow the insertion of a synchronization signal and the combined signals are transmitted. At the receiver, the synchronization sequence is extracted and operated upon to provide an identical local sequence, which is used to decrypt the information signal. The counter addressing mode synchronous communication system solves the range reduction problem experienced by present cipher feedback systems, and further, provides a means to especially adapt cipher feedback devices for use in the present inventive secure communication system so that they may enjoy the benefit of range extension. To implement the teachings of the present invention, it may be especially convenient to incorporate several of the elements of FIG. 2 into a custom IC. In the preferred embodiment of the transceiver 200, the encryptor 208, the compressor 210, the sequence generator 212, the error corrector 230 (if used), the sync detector 232, the expander 234 and the decryptor 238 are all incorporated in a single IC. Of course, other arrangements are possible.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. In a secure communication system, a method for communicating an information signal from a transmitter to at least one receiver, comprising the steps of:
   at the transmitter:
   (a) encrypting the information signal to provide an encrypted signal having a first bandwidth;
   (b) time compressing said encrypted signal to provide a compressed signal having a bandwidth not exceeding said first bandwidth;
   (c) inserting at least a portion of a pseudo-random synchronization signal into said compressed signal to provide a combined signal having a bandwidth not exceeding said first bandwidth;
   (d) transmitting said combined signal to at least one receiver;
   at the receivers:
   (a) receiving the transmitted signal to provide a received signal;
   (b) operating on said received signal to provide a pseudo-random synchronization signal;
   (c) time expanding said received signal to provide an expanded signal having a bandwidth substantially equal to said first bandwidth;
   (d) decrypting said expanded signal to provide a decrypted signal comprising the information signal.

2. The method of claim 1, which includes the step of repeating, at least once, said combined transmitted signal.

3. The method of claim 1, which includes the transmitter steps of:
   (a) generating a plurality of pseudo-random synchronization signals;
   (b) selecting one pseudo-random synchronization signal to be inserted into said compressed signal.

4. The method of claim 1, wherein the transmitter steps of encrypting and time compressing are reversed.

5. The method of claim 4, wherein the receiver steps of time expanding and decrypting are reversed.

6. The method of claim 1, wherein the information signal is a voice signal.

7. The method of claim 6, which includes the transmitter step of digitizing said voice signal.

8. The method of claim 6, which includes the receiver step of operating on said decrypted signal to provide said voice signal.

9. The method of claim 1, wherein the information signal is a data signal.

10. The method of claim 9, which includes the transmitter step of operating on said data signal to provide a redundant data signal.

11. The method of claim 9, which includes the receiver step of discarding redundant data bits from said decrypted signal to provide said data signal.

12. The method of claim 1, which includes the receiver step of detecting an end-of-message signal and squelching the receiver in response thereto.

13. The method of claim 1, wherein said time compressing step comprises the steps of:
   (a) discarding every Nth bit of the information signal;
   (b) arranging, contiguously, any remaining information bits to provide said compressed information signal.

14. The method of claim 13, which includes the step of, at each of every Nth bit, discarding a predetermined number of bits.

15. The method of claim 13, wherein said discarding step comprises the step of removing each of said Nth information bit from a memory means.

16. The method of claim 1, wherein said inserting step comprises interleaving, periodically, said at least a portion of said pseudo-random synchronization signal with said compressed signal at a predetermined interleaving rate.

17. The method of claim 16, wherein said predetermined interleaving rate is dynamically alterable.

18. The method of claim 1, wherein said transmitting step comprises the steps of:
   transmitting:
   (a) a preamble;
   (b) said at least a portion of said pseudo-random, synchronization signal;
   (c) at least a portion of said information signal;
   repeating the transmission of (b) and (c) until all of the information signal is transmitted.

19. The method of claim 18, which includes the step of transmitting an end-of-message signal at the conclusion of the information signal.

20. The method of claim 1, wherein said receiver step (b) comprises the steps of:
   (a) loading, in parallel, at least a portion of said received signal into a sequence generating means;
   (b) generating a local pseudo-random synchronization sequence;
   (c) comparing said local pseudo-random synchronization sequence to said received signal to provide an error count;
   (d) providing said local pseudo-random synchronization signal if said error count is below a predetermined threshold;
   (e) repeating steps (a) through (d) if said error count is above a predetermined threshold.

21. The method of claim 20, wherein said comparing step comprises the step of summing, modulo two, said received signal and said local pseudo-random synchronization sequence.

22. The method of claim 20, which includes the steps of:
   (a) inverting said received signal to provide an inverted signal;

(b) loading, in parallel, at least a portion of said inverted signal into a sequence generating means;
(c) generating a local pseudo-random synchronization sequence;
(d) comparing said local pseudo-random synchronization sequence to said inverted signal to provide an error count;
(e) providing said local pseudo-random synchronization signal if said error count is below a predetermined threshold;
(f) repeating steps (b) through (e) if said error count is above a predetermined threshold.

23. The method of claim 22, wherein said comparing step comprises the step of summing, modulo two, said inverted signal and said local pseudo-random synchronization sequence.

24. The method of claim 1, wherein said expanding step comprising the steps of:
(a) receiving the compressed information signal to provide a received signal;
(b) predicting every Nth bit from said received signal;
(c) interleaving said received signal with said predicted bits to provide a recovered signal.

25. The method of claim 24, wherein the step of predicting comprises the steps of:
(a) storing said received signal in a storage means to provide a stored signal;
(b) retrieving said stored signal from said storage means;
(c) selecting, at every Nth bit of said stored signal at least one predicted bit derived from said stored signal.

26. The method of claim 1, wherein said time compressing step comprises the steps of:
(a) discarding every Nth bit of the information signal;
(b) arranging, contiguously, any remaining information bits to provide said compressed information signal.

27. The method of claim 26, which includes the step of, at each of said Nth bits discarding a predetermined number of bits.

28. The method of claim 26, wherein said discarding step comprises the step of removing every of said Nth information bit from a memory means.

29. In a secure communication system, a method for communicating a voice signal from a transmitter to at least one receiver, comprising the steps of:
at the transmitter:
(a) digitizing the voice signal to provide a digitized signal;
(b) encrypting said digitized signal to provide an encrypted signal;
(c) time compressing said encrypted signal by arbitrarily discarding at least one bit of said encrypted signal to provide a compressed signal;
(d) inserting at least a portion of a pseudo-random synchronization signal into said compressed signal to provide a combined signal;
(e) transmitting said combined signal to at least one receiver;
at the receivers:
(a) receiving the transmitted signal to a received signal;
(b) operating on said received signal to provide a pseudo-random synchronization signal;
(c) time expanding said received signal by predicting a logic state for said at least one discarded bit to provide an expanded signal;
(d) decrypting said expanded signal to provide a decrypted signal;
(e) converting said decrypted signal into an analog signal comprising the voice signal.

30. The method of claim 29, which includes the step of repeating, at least once, said combined transmitted signal.

31. The method of claim 29, which includes the transmitter steps of:
(a) generating a plurality of pseudo-random synchronization signals;
(b) selecting one pseudo-random synchronization signal to be inserted into said compressed signal.

32. The method of claim 29, wherein the transmitter steps of encrypting and time compressing are reversed.

33. The method of claim 32, wherein the receiver steps of time expanding and decrypting are reversed.

34. The method of claim 29, which includes the receiver step of detecting an end-of-message signal and squelching the receiver in response thereto.

35. The method of claim 29, wherein said transmitting step comprises the steps of:
transmitting:
(a) a preamble;
(b) said at least a portion of said pseudo-random synchronization signal;
(c) at least a portion of said information signal;
repeating the transmission of (b) and (c) until all of the information signal is transmitted.

36. The method of claim 35, which includes the step of transmitting an end-of-message signal at the conclusion of the information signal.

37. The method of claim 29, wherein said inserting step comprises interleaving, periodically, said at least a portion of said pseudo-random synchronization signal with said compressed signal at a predetermined interleaving rate.

38. The method of claim 37, wherein said predetermined interleaving rate is dynamically alterable.

39. The method of claim 29, wherein said receiver step (b) comprises the steps of:
(a) loading, in parallel, at least a portion of said received signal into a sequence generating means;
(b) generating a local pseudo-random synchronization sequence;
(c) comparing said local pseudo-random synchronization sequence to said received signal to provide an error count;
(d) providing said local pseudo-random synchronization signal if said error count is below a predetermined threshold;
(e) repeating steps (a) through (d) if said error count is above a predetermined threshold.

40. The method of claim 39, wherein said comparing step comprises the step of summing, modulo two, said received signal and said local pseudo-random synchronization sequence.

41. The method of claim 39, which includes the steps of:
(a) inverting said received signal to provide an inverted signal;
(b) loading, in parallel, at least a portion of said inverted signal into a sequence generating means;
(c) generating a local pseudo-random synchronization sequence;
(d) comparing said local pseudo-random synchronization sequence to said inverted signal to provide an error count;

(e) providing said local pseudo-random synchronization signal if said error count is below a predetermined threshold;
(f) repeating steps (b) through (e) if said error count is above a predetermined threshold.

42. The method of claim 41, wherein said comparing step comprises the step of summing, modulo two, said inverted signal and said local pseudo-random synchronization sequence.

43. The method of claim 29, wherein said expanding step comprising the steps of:
(a) receiving the compressed information signal to provide a received signal;
(b) predicting every Nth bit from said received signal;
(c) interleaving said received signal with said predicted bits to provide a recovered signal.

44. The method of claim 43, wherein the step of predicting comprises the steps of:
(a) storing said received signal in a storage means to provide a stored signal;
(b) retrieving said stored signal from said storage means;
(c) selecting, at every Nth bit of said stored signal at least one predicted bit derived from said stored signal.

45. In a secure communication system, a method for communicating a voice signal from a transmitter to at least one receiver, comprising the steps of:
at the transmitter:
(a) digitizing the voice signal to provide a digitized signal;
(b) encrypting said digitized signal to provide an encrypted signal;
(c) discarding every Nth bit of said encrypted signal;
(d) time compressing the remaining encrypted signal to provide a compressed signal;
(e) generating a pseudo-random synchronization signal;
(f) inserting at least a portion of said pseudo-random synchronization signal into said compressed signal to provide a combined signal;
(g) transmitting said combined signal to at least one receiver;
at the receivers:
(a) receiving the transmitted signal to provide a received signal;
(b) inverting said received signal to provide an inverted signal;
(c) loading, in parallel, at least a portion of said received signal into a first sequence generating means;
(d) generating a first local pseudo-random synchronization sequence;
(e) comparing said local pseudo-random synchronization sequence and said received signal to provide an error count;
(f) providing a first pseudo-random synchronization signal if said error count is below a predetermined threshold else repeating from step (c);
(g) loading, in parallel, at least a portion of said inverted signal into a second sequence generating means;
(h) generating a second local pseudo-random synchronization sequence;
(i) comparing said second local pseudo-random synchronization sequence and said inverted signal to provide an error count;
(j) providing a second pseudo-random synchronization signal if said error count is below a predetermined threshold else repeating from step (c);
(k) providing either said received signal or said inverted signal to a predictor in response to said first and second pseudo-random synchronization signals;
(l) predicting every Nth bit of said received signal in response to step (k);
(m) interleaving said predicted bits with their respective signals to provide an expanded signal;
(n) decrypting said expanded signal to provide a decrypted signal;
(o) converting said decrypted signal into an analog signal comprising the voice signal.

46. The method of claim 45, which includes the transmitter steps of:
(a) generating a plurality of pseudo-random synchronization signals;
(b) selecting one pseudo-random synchronization signal to be inserted into said compressed signal.

47. A secure transceiving device, comprising:
a transmitter comprising:
means for encrypting the information signal to provide an encrypted signal having a first bandwidth;
means for time compressing said encrypted signal to provide a compressed signal having a bandwidth not exceeding said first bandwidth;
means for inserting at least a portion of a pseudo-random synchronization signal into said compressed signal to provide a combined signal having a bandwidth not exceeding said first bandwidth;
means for transmitting said combined signal to at least one receiver;
at least one receiver comprising:
means for receiving the transmitted signal to provide a received signal;
means for operating on said received signal to provide a pseudo-random synchronization signal;
means for time expanding said received signal to provide an expanded signal having a bandwidth substantially equal to said first bandwidth;
means for decrypting said expanded signal to provide a decrypted signal comprising the information signal.

48. A secure transceiving device, comprising:
a transmitter comprising:
means for digitizing the voice signal to provide a digitized signal;
means for encrypting said digitized signal to provide an encrypted signal;
means for discarding every Nth bit of said encrypted signal;
means for time compressing the remaining encrypted signal to provide a compressed signal;
means for generating a pseudo-random synchronization signal;
means for inserting at least a portion of said pseudo-random synchronization signal into said compressed signal to provide a combined signal;
means for transmitting said combined signal to at least one receiver;
at least one receiver comprising:
means for receiving the transmitted signal to provide a received signal;

means for inverting said received signal to provide an inverted signal;

means for loading, in' parallel, at least a portion of said received signal into a first sequence generating means;

means for generating a first local pseudo-random synchronization sequence;

means for comparing said local pseudo-random synchronization sequence and said received signal to provide an error count;

means for providing said first pseudo-random synchronization signal if said error count is below a predetermined threshold;

means for loading, in parallel, at least a portion of said inverted signal into a second sequence generating means;

means for generating a second local pseudo-random synchronization sequence;

means for comparing said second local pseudo-random synchronization sequence and said inverted signal to provide an error count;

means for providing said second local pseudo-random synchronization signal if said error count is below a predetermined threshold;

means for providing either said received signal or said inverted signal to a predictor in response to said first and second pseudo-random synchronization signals;

means for predicting every Nth bit of said received signal or said inverted signal;

means for interleaving said predicted bits with their respective signals to provide an expanded signal;

means for decrypting said expanded signal to provide a decrypted signal;

means for converting said decrypted signal into an analog signal comprising the voice signal.

49. The transceiving device of claim 48, the transmitter including:
(a) means for generating a plurality of pseudo-random synchronization signals;
(b) means for selecting one pseudo-random synchronization signal to be inserted into said compressed signal.

50. In a secure communication system wherein a transmitter operates to:
(a) encrypt an information signal to provide an encrypted signal having a first bandwidth;
(b) time compress said encrypted signal to provide a compressed signal having a bandwidth not exceeding said first bandwidth;
(c) insert at least a portion of a pseudo-random synchronization signal into said compressed signal to provide a combined signal having a bandwidth not exceeding said first bandwidth; and
(d) transmit said combined signal to at least one receiver;

a receiver for use in said secure communication system, comprising:
means for receiving the transmitted signal to provide a received signal;
means for operating on said received signal to provide a pseudo-random synchronization signal;
means for expanding said received signal to provide an expanded signal having a bandwidth substantially equal to said first bandwidth;
means for decrypting said expanded signal to provide a decrypted signal comprising the information signal.

51. In a secure communication system wherein a transmitter operates to:
(a) encrypt an information signal to provide an encrypted signal having a first bandwidth;
(b) time compress said encrypted signal to provide a compressed signal having a bandwidth not exceeding said first bandwidth;
(c) insert at least a portion of a pseudo-random synchronization signal into said compressed signal to provide a combined signal having a bandwidth not exceeding said first bandwidth; and
(d) transmit said combined signal to at least one receiver;

a method for recovering said information signal from said transmitted signal, comprising the steps of:
(a) operating on the received signal to provide a pseudo-random synchronization signal;
(b) time expanding said received signal to provide an expanded signal having a bandwidth substantially equal to said first bandwidth;
(c) decrypting said expanded signal to provide a decrypted signal;
(d) operating upon said decrypted signal to recover the information signal.

52. A receiver for use in a secure communication system, comprising:
means for receiving the transmitted signal to provide a received signal;
means for inverting said received signal to provide an inverted signal;
means for loading, in parallel, at least a portion of said received signal into a first sequence generating means;
means for generating a first local pseudo-random synchronization sequence;
means for comparing said local pseudo-random synchronization sequence and said received signal to provide an error count;
means for providing said first pseudo-random synchronization signal if said error count is below a predetermined threshold;
means for loading, in parallel, at least a portion of said inverted signal into a second sequence generating means;
means for generating a second local pseudo-random synchronization sequence;
means for comparing said second local pseudo-random synchronization sequence and said inverted signal to provide an error count;
means for providing said second local pseudo-random synchronization signal if said error count is below a predetermined threshold;
means for providing either said received signal or said inverted signal to a predictor in response to said first or second pseudo-random synchronization signals;
means for predicting every Nth bit of said received signal or said inverted signal;
means for interleaving said predicted bits with their respective signals to provide an expanded signal;
means for decrypting said expanded signal to provide a decrypted signal;
means for converting said decrypted signal into an analog signal comprising the voice signal.

53. A method for receiving an encrypted information signal from a transmitted signal, comprising the steps of:
(a) receiving the transmitted signal to provide a received signal;

(b) inverting said received signal to provide an inverted signal;
(c) loading, in parallel, at least a portion of said received signal into a first sequence generating means;
(d) generating a first local pseudo-random synchronization sequence;
(e) comparing said local pseudo-random synchronization sequence and said received signal to provide an error count;
(f) providing a first pseudo-random synchronization signal if said error count is below a predetermined threshold else repeating from step (c);
(g) loading, in parallel, at least a portion of said inverted signal into a second sequence generating means;
(h) generating a second local pseudo-random synchronization sequence;
(i) comparing said second local pseudo-random synchronization sequence and said inverted signal to provide an error count;
(j) providing a second pseudo-random synchronization signal if said error count is below a predetermined threshold else repeating from step (c);
(k) providing either said received signal or said inverted signal to a predictor in response to said first or second pseudo-random synchronization signals;
(l) predicting every Nth bit of said received signal or said inverted signal in response to step (k);
(m) interleaving said predicted bits with their respective signals to provide an expanded signal;
(n) decrypting said expanded signal to provide a decrypted signal;
(o) operating upon said decrypted signal to provide the information signal.

* * * * *